United States Patent
Okada et al.

(10) Patent No.: US 8,897,594 B2
(45) Date of Patent: Nov. 25, 2014

(54) IMAGE READER, MOBILE TERMINAL APPARATUS, AND NON-TRANSITORY COMPUTER READABLE MEDIUM

(75) Inventors: Shigeru Okada, Kanagawa (JP); Hiroyoshi Uejo, Kanagawa (JP); Sei Amagai, Kanagawa (JP); Kazuhiro Ohya, Kanagawa (JP); Minoru Sodeura, Kanagawa (JP); Shinji Hanaoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 201 days.

(21) Appl. No.: 13/541,364

(22) Filed: Jul. 3, 2012

(65) Prior Publication Data

US 2013/0182293 A1 Jul. 18, 2013

(30) Foreign Application Priority Data

Jan. 17, 2012 (JP) .................................. 2012-006658

(51) Int. Cl.
*G06K 9/20* (2006.01)
*G06K 7/00* (2006.01)
*H04N 1/387* (2006.01)
*H04N 1/46* (2006.01)

(52) U.S. Cl.
USPC ............ 382/283; 382/312; 358/450; 358/505

(58) Field of Classification Search
CPC .......... H04N 1/00355; H04N 1/00358; H04N 1/00374; H04N 1/00376; G06T 2201/0051–2201/0053
USPC ......... 382/283, 284, 305, 312; 358/1.18, 450, 358/505, 517, 540
See application file for complete search history.

(56) References Cited

U.S. PATENT DOCUMENTS

| 8,179,556 | B2 * | 5/2012 | Salgado et al. | 358/1.18 |
| 8,209,598 | B1 * | 6/2012 | Pandey | 715/205 |
| 8,233,193 | B2 * | 7/2012 | Shiitani et al. | 358/2.1 |
| 8,488,181 | B2 * | 7/2013 | Wu et al. | 358/1.18 |

FOREIGN PATENT DOCUMENTS

| JP | A-2008-59255 | 3/2008 |
| JP | A-2010-33177 | 2/2010 |

* cited by examiner

*Primary Examiner* — Kanjibhai Patel
(74) *Attorney, Agent, or Firm* — Oliff PLC

(57) ABSTRACT

An image reader includes a reading unit that reads an image; a detection unit that detects marks from the read image read by the reading unit; a creation unit that creates a hiding image, which hides a region including the marks, on the basis of the marks detected by the detection unit; and a combining unit that combines the read image and the hiding image to create an electronic document.

17 Claims, 31 Drawing Sheets

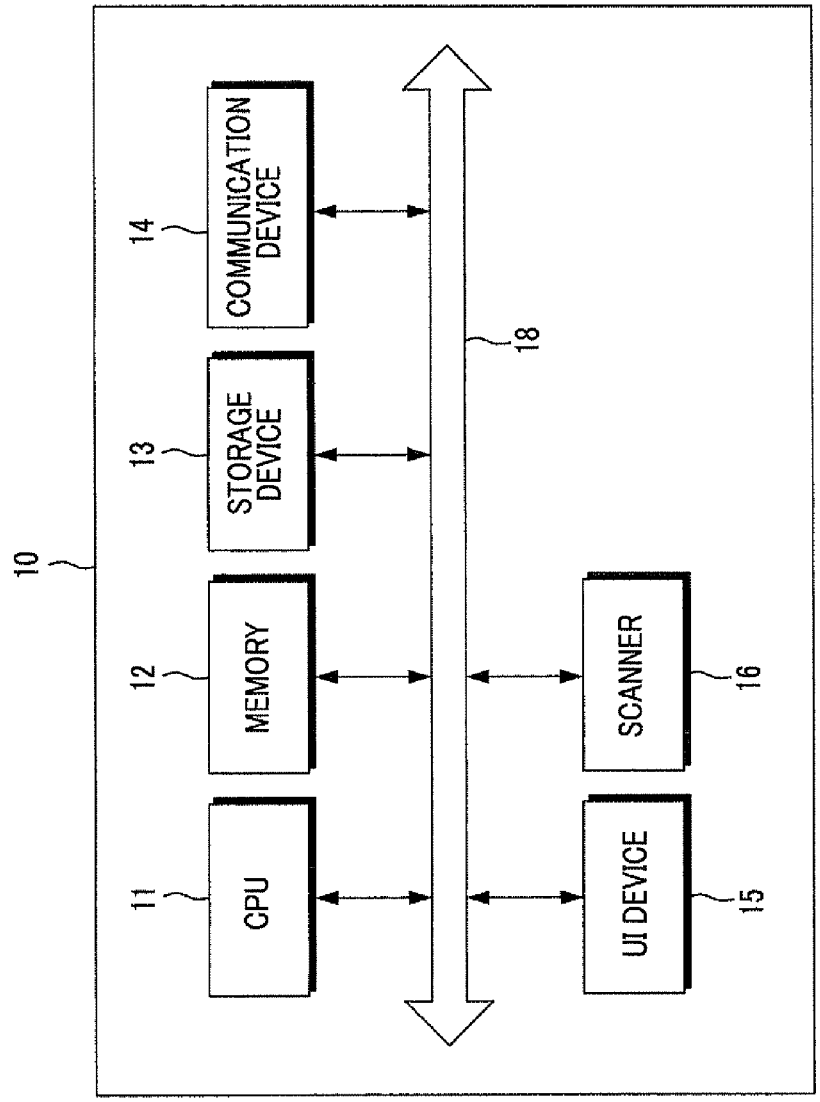

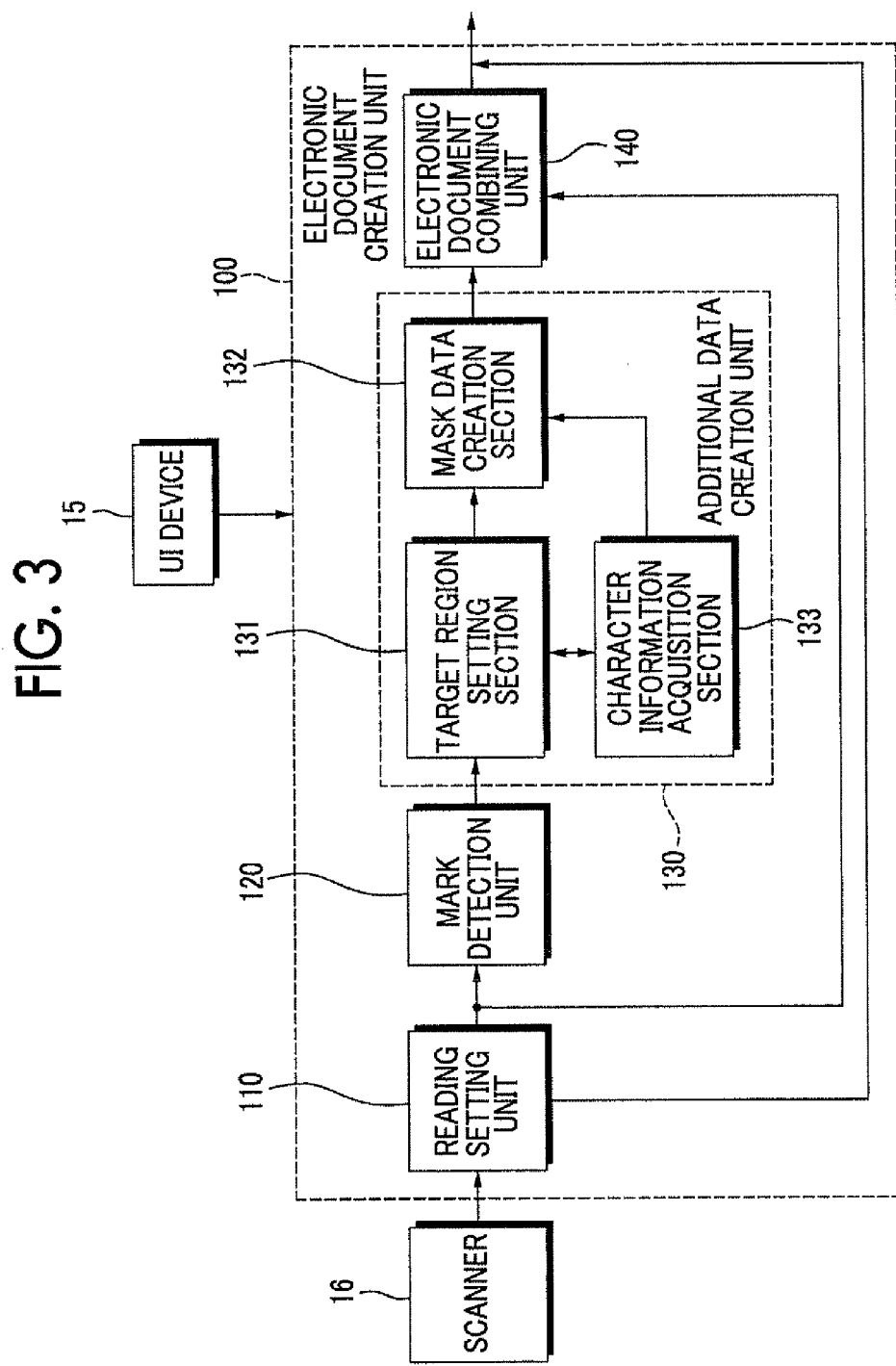

MASK-PROCESSED DOCUMENT

NORMALLY PROCESSED DOCUMENT

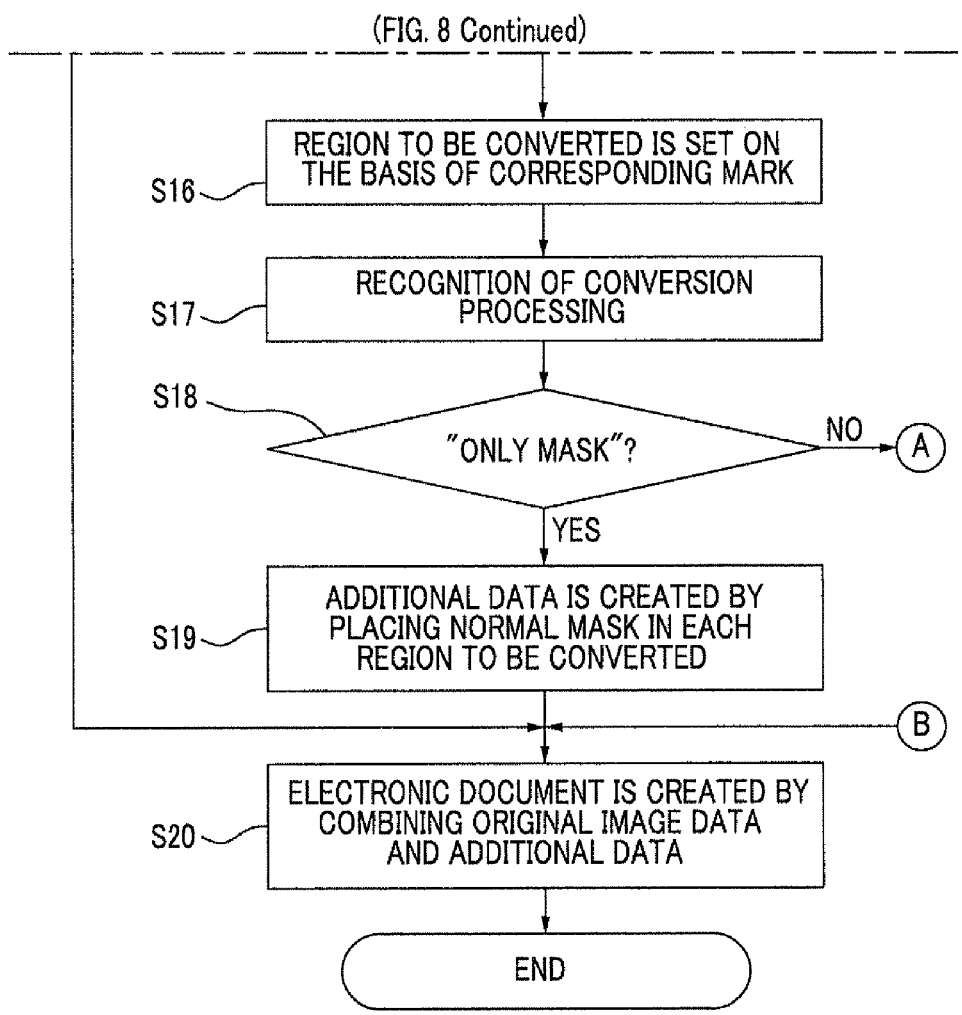

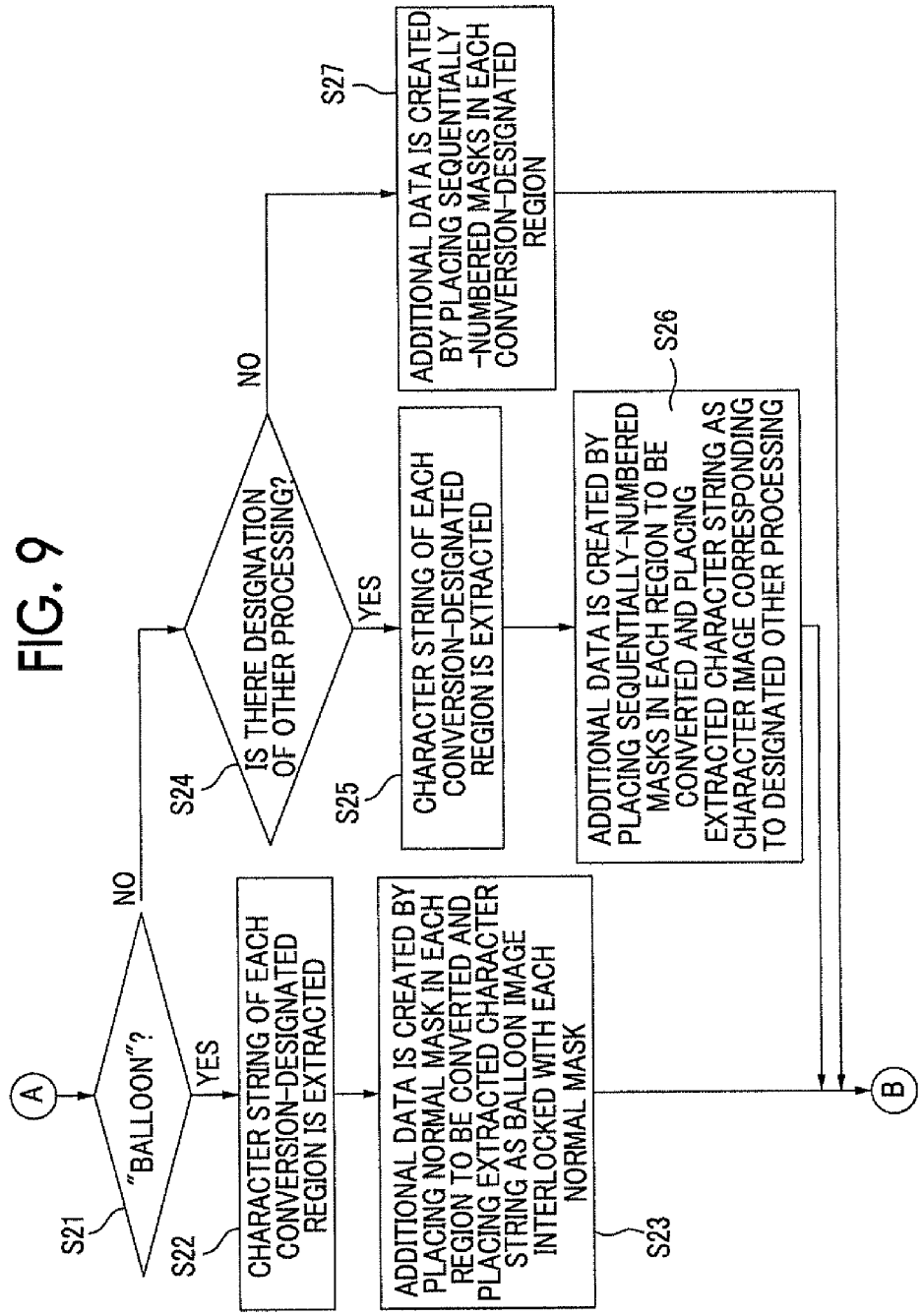

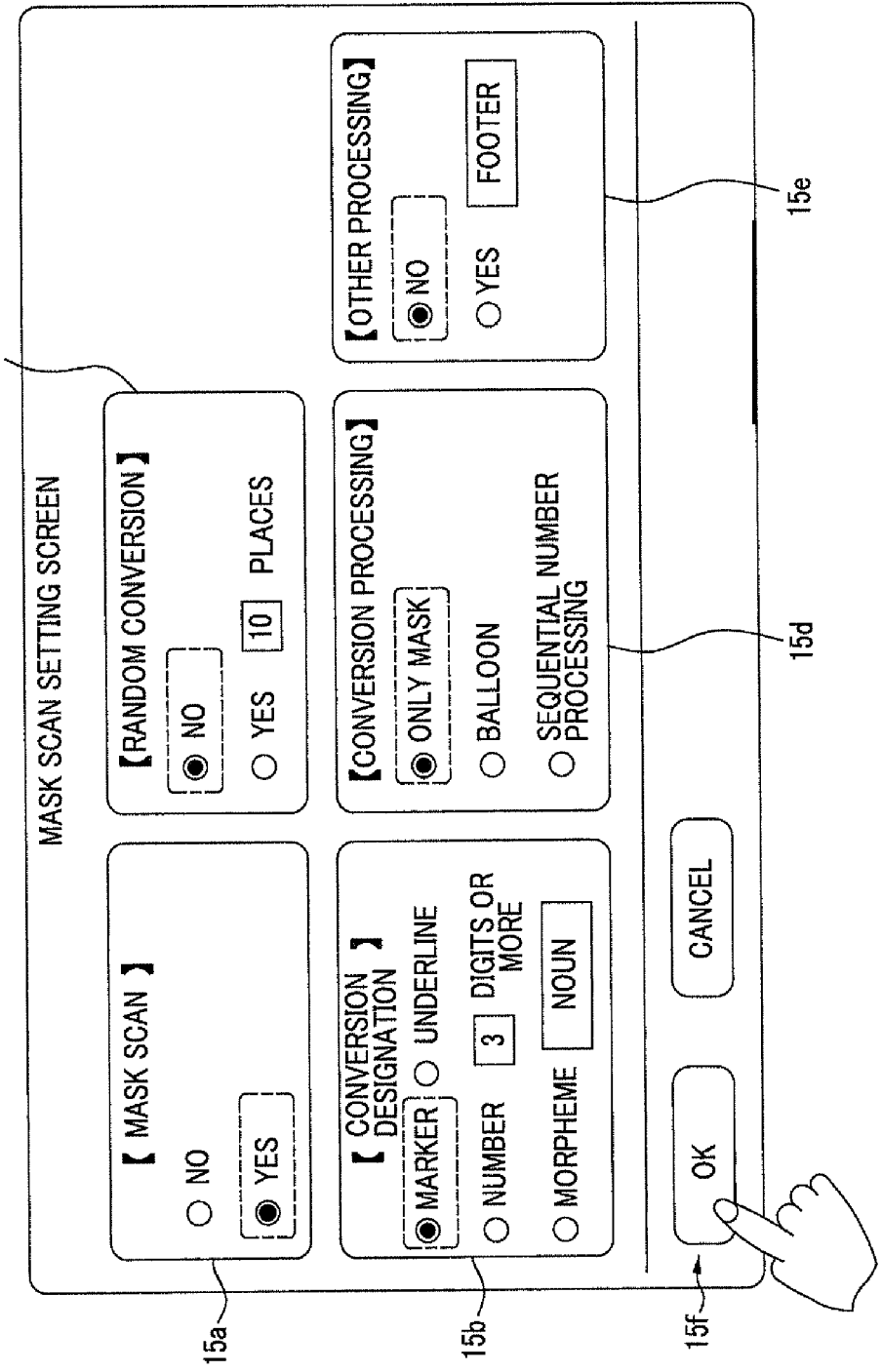

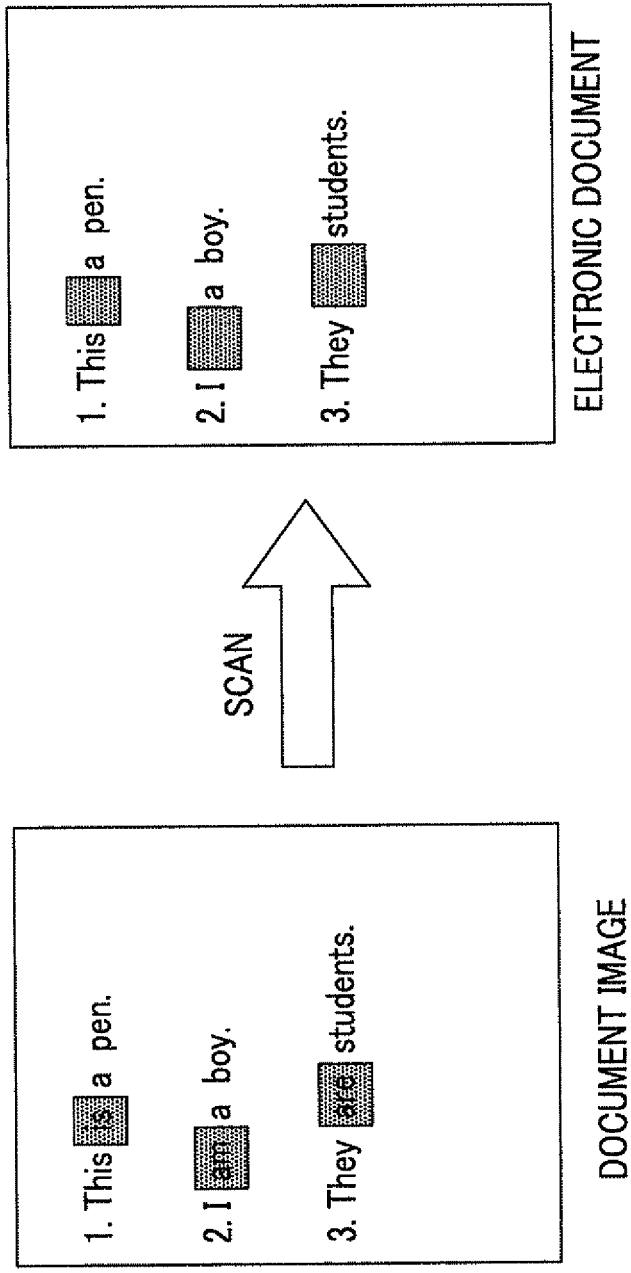

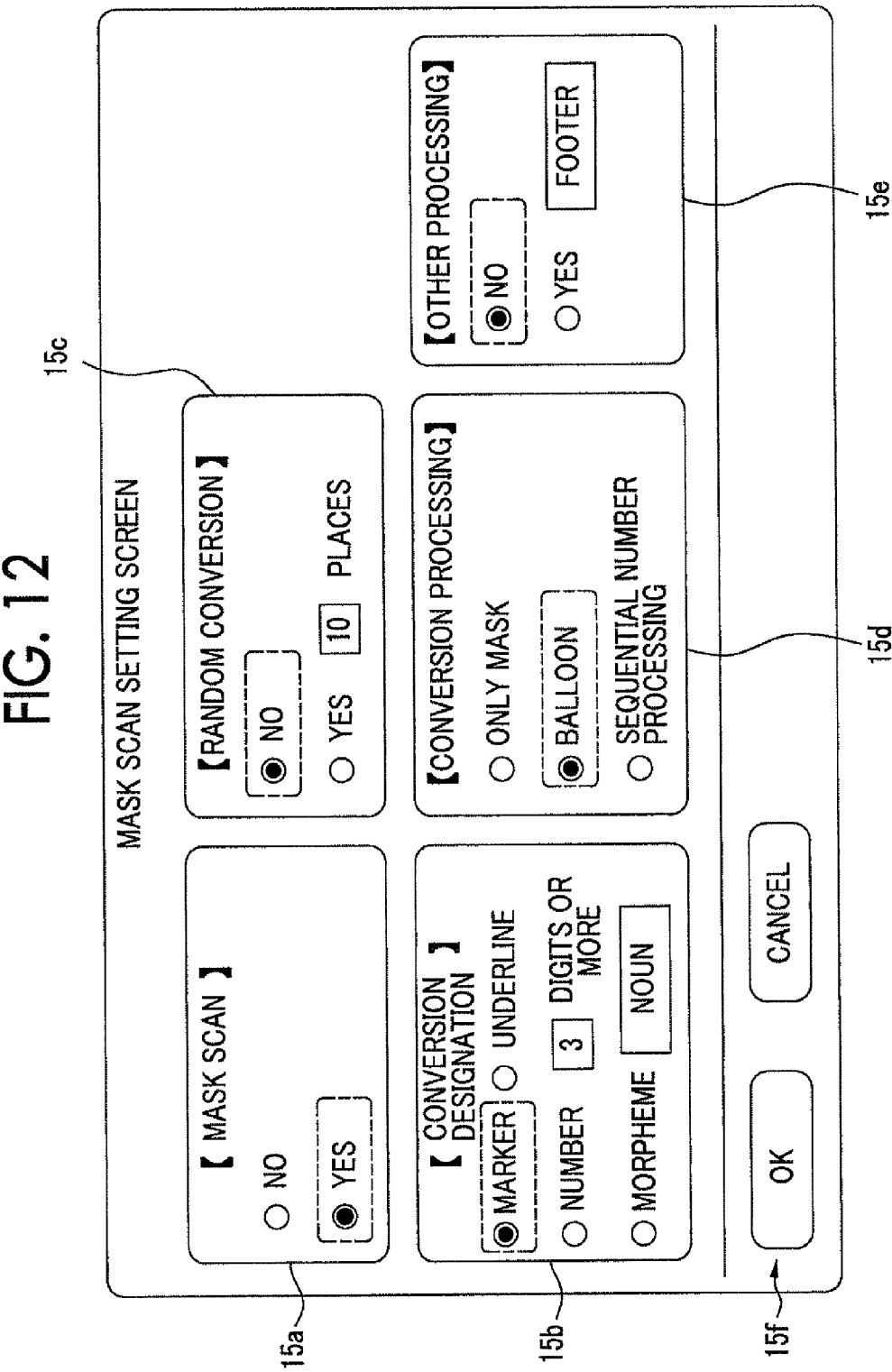

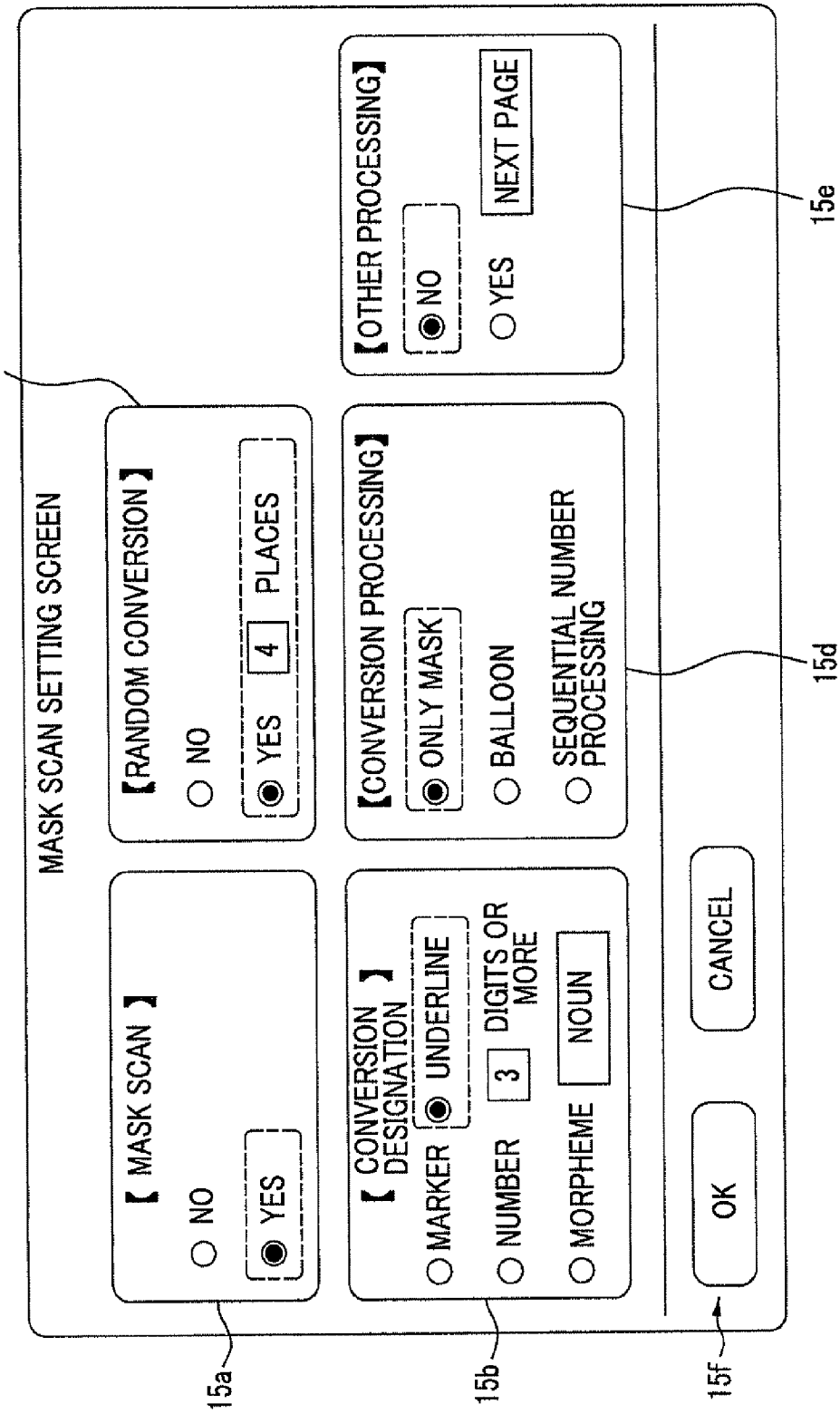

FIG. 17

DOCUMENT IMAGE

Hanako: Hello, Taro. How are you?
Taro: I'm fine, thank you, and you?
Hanako: I'm fine, too.
Taro: Are you free this evening?
Hanako: Yes, I am.
Taro: Why don't you go to the movie with me?
Hanako: Ok.
Taro: So I will call you later.
Hanako: Ok, see you later.
Taro: Bye.

SCAN ⇒

ELECTRONIC DOCUMENT

Hanako: Hello, Taro. How are you?
Taro: I'm fine, thank you, 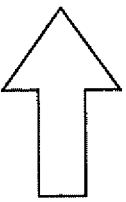 you?
Hanako: I'm fine, 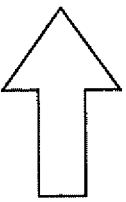
Taro: Are you free this evening?
Hanako: Yes, I am.
Taro: Why don't you go to the movie 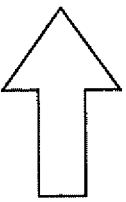 me?
Hanako: Ok.
Taro: So I 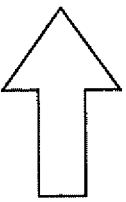 call you later.
Hanako: Ok, see you later.
Taro: Bye.

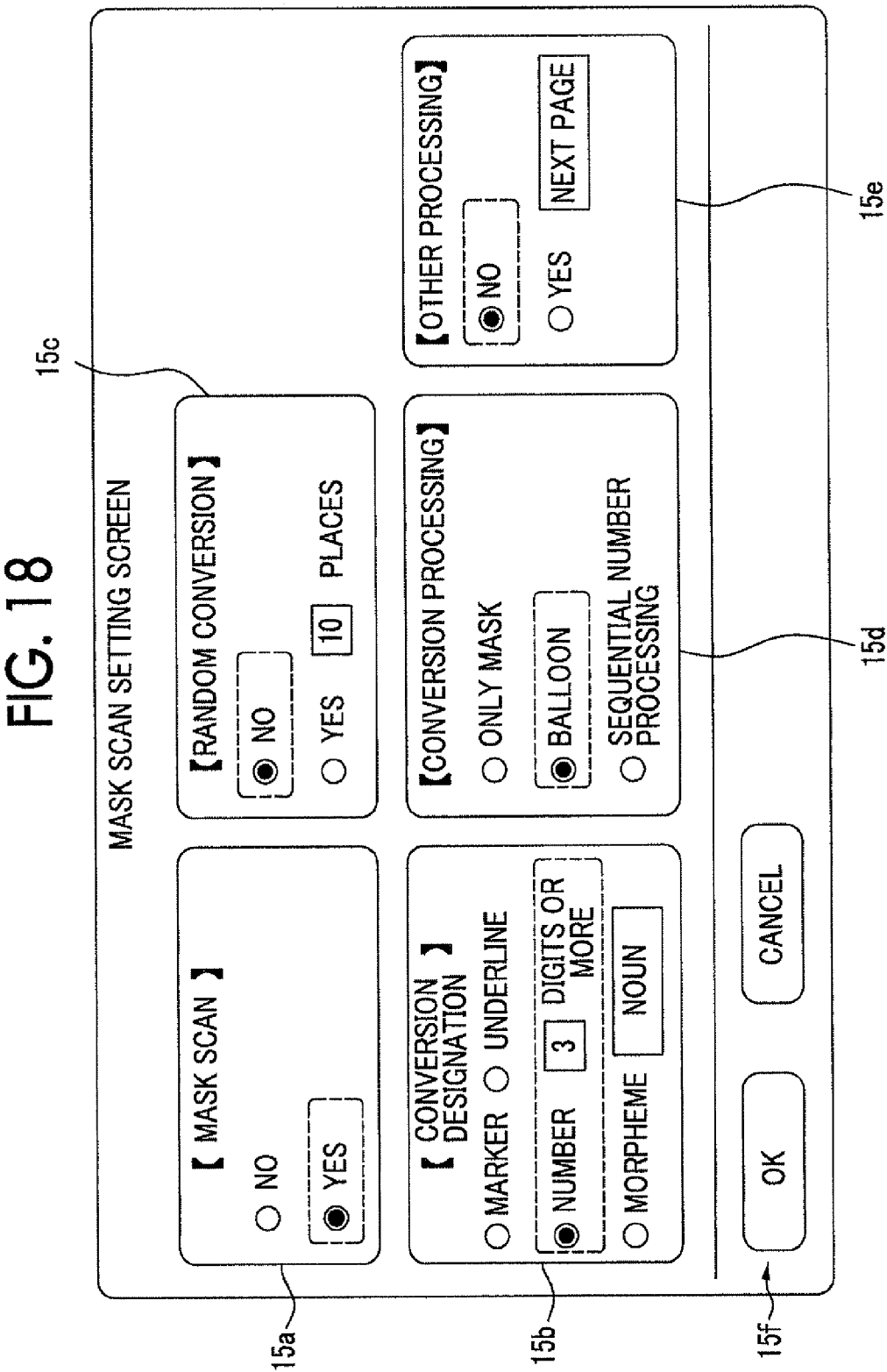

FIG. 21
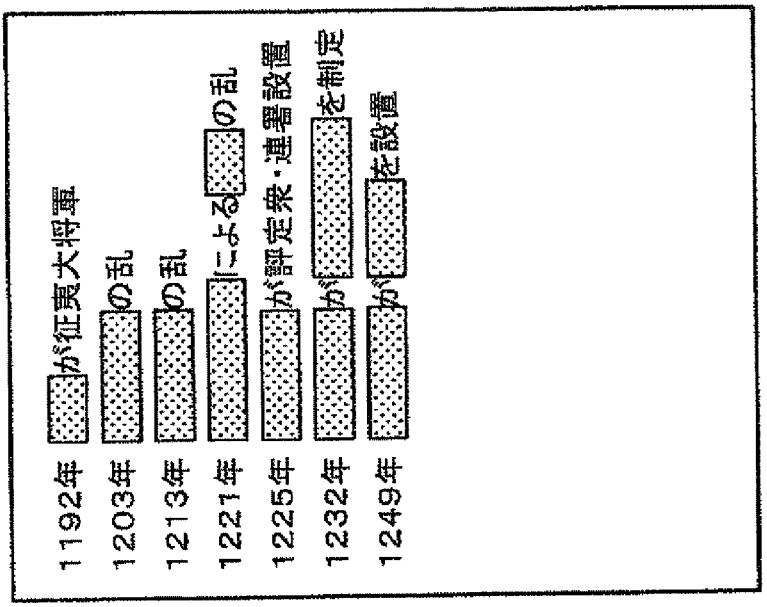
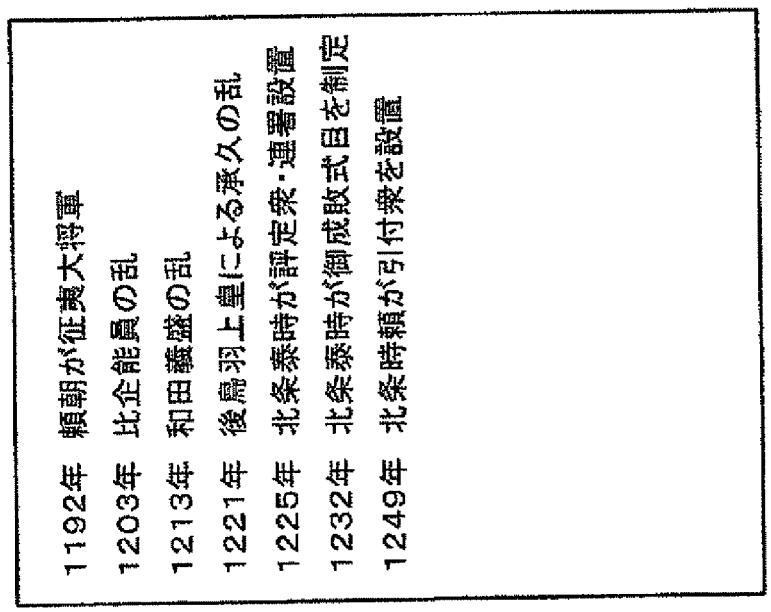

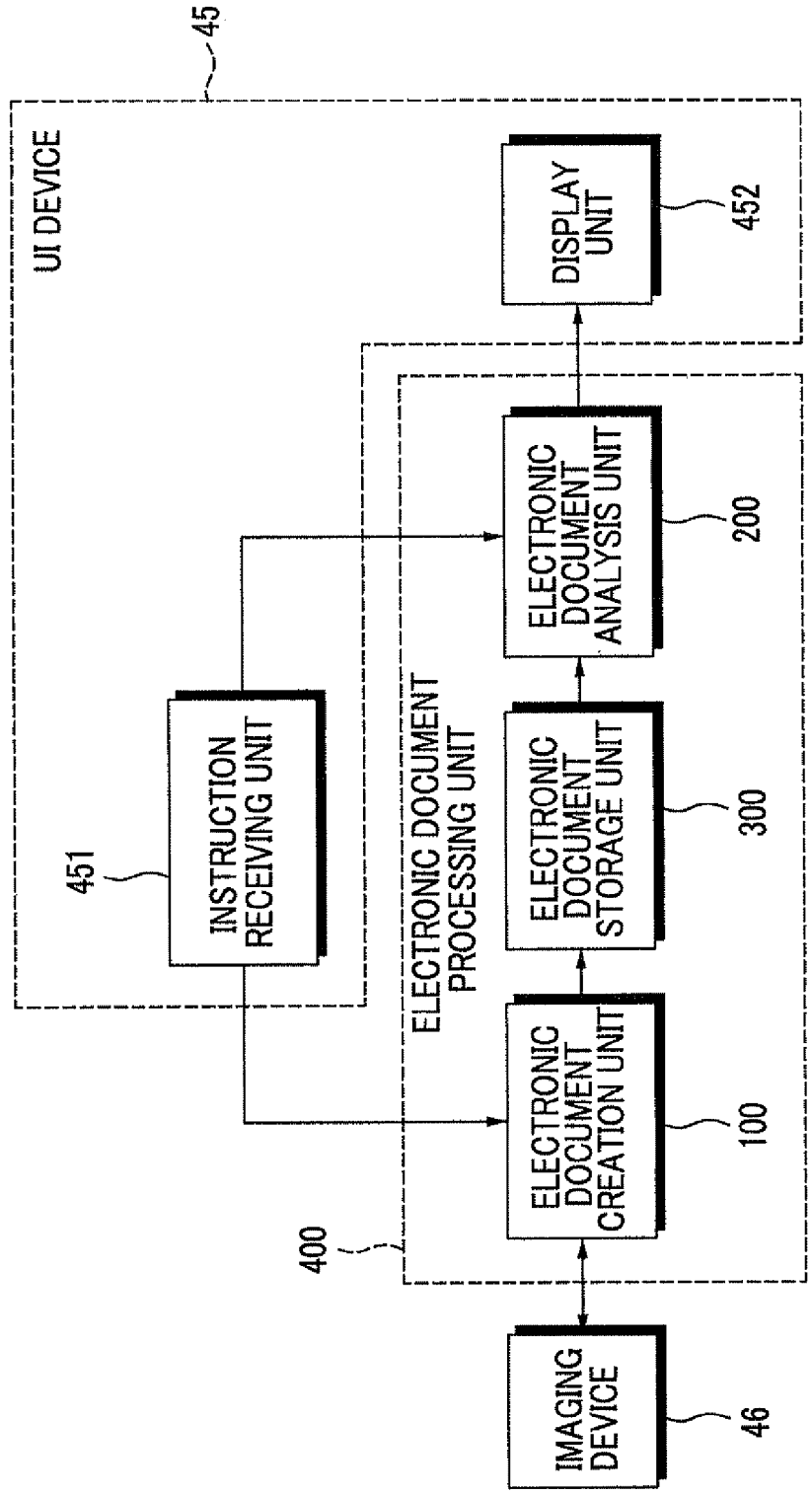

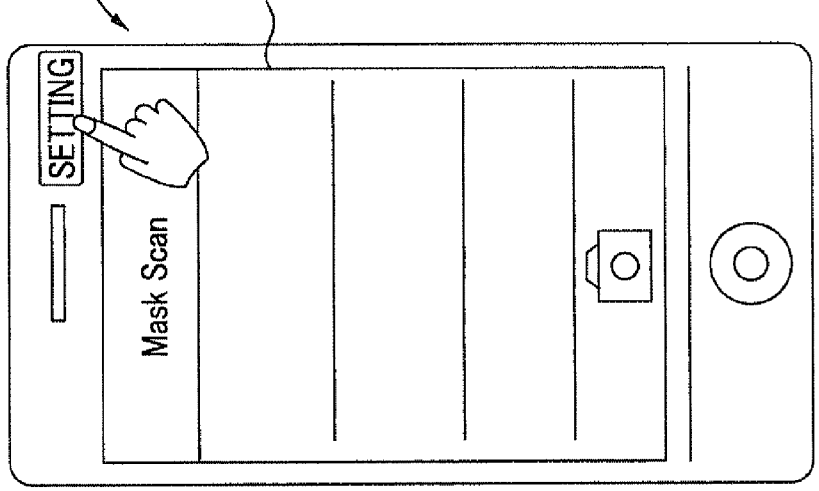
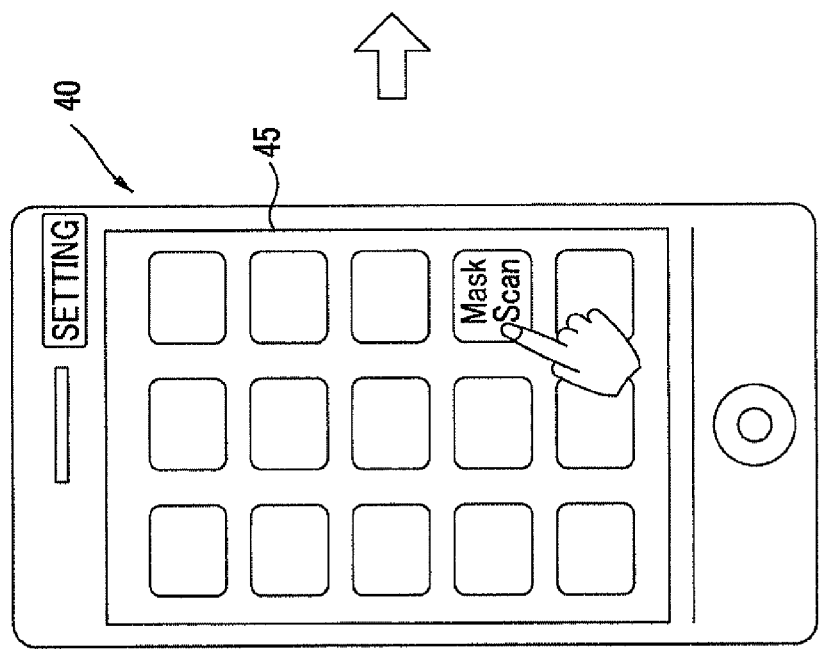

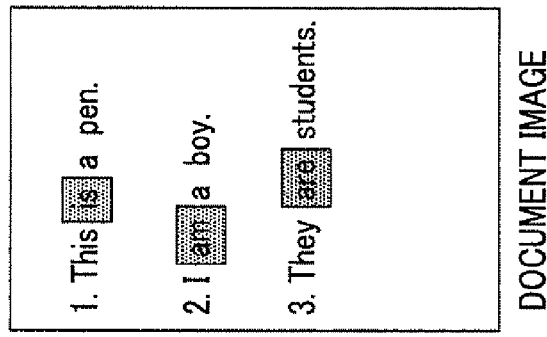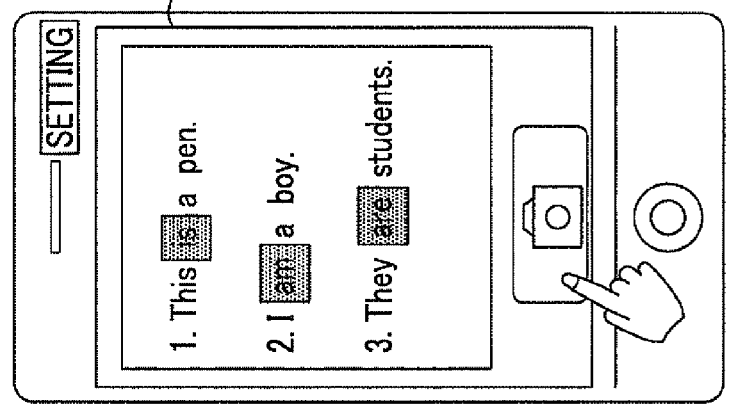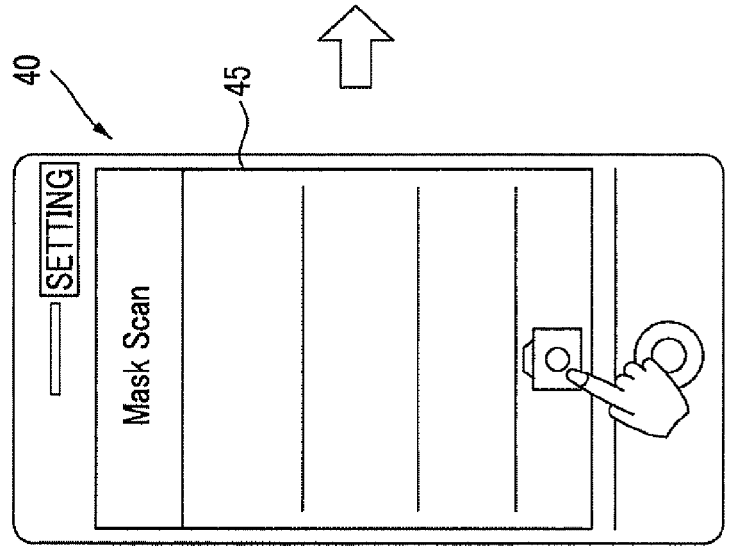

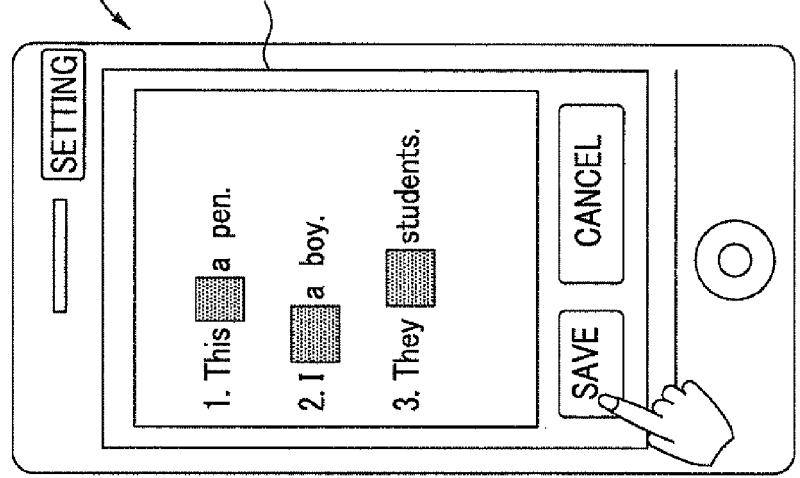
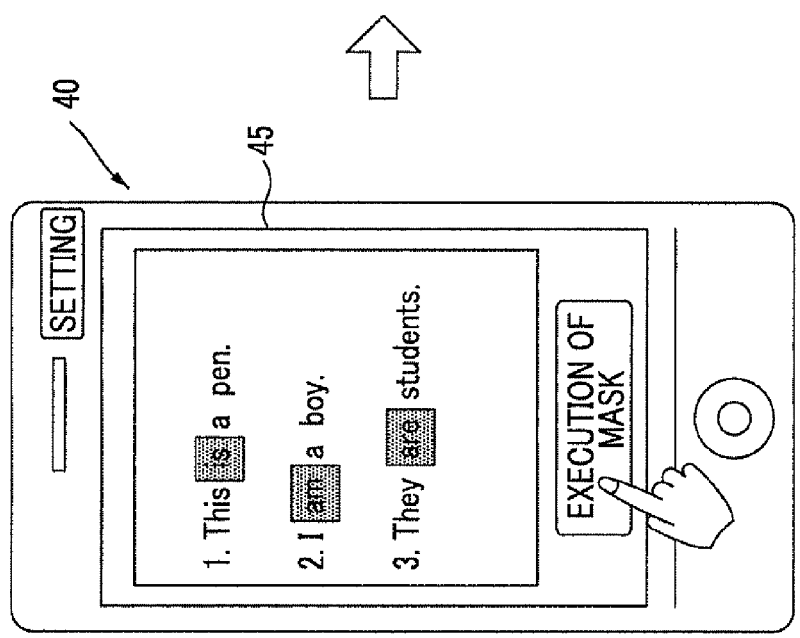

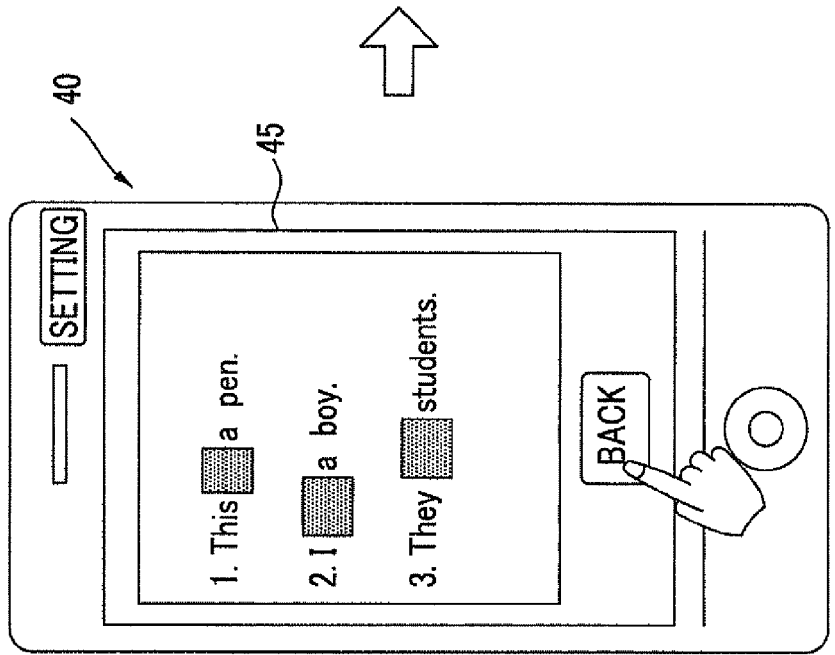
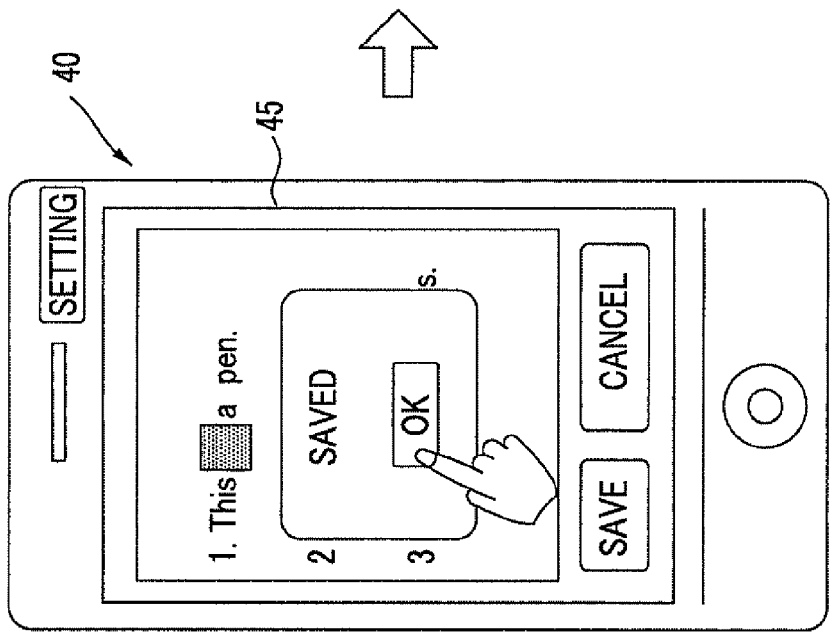

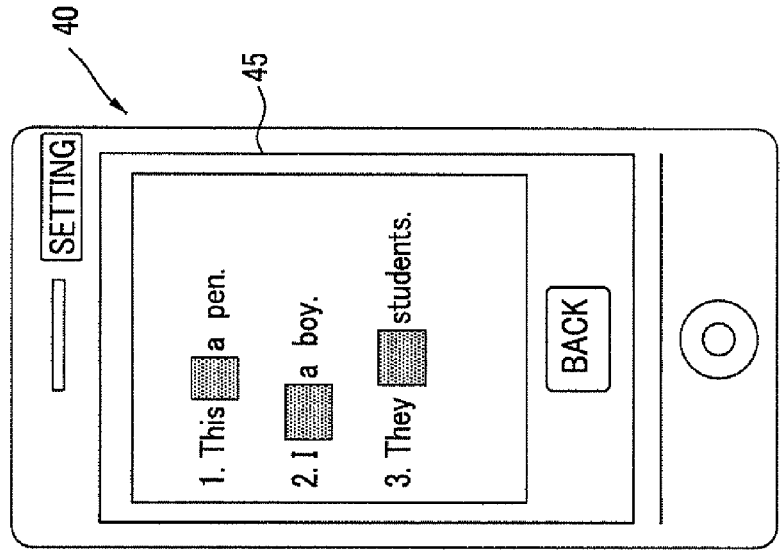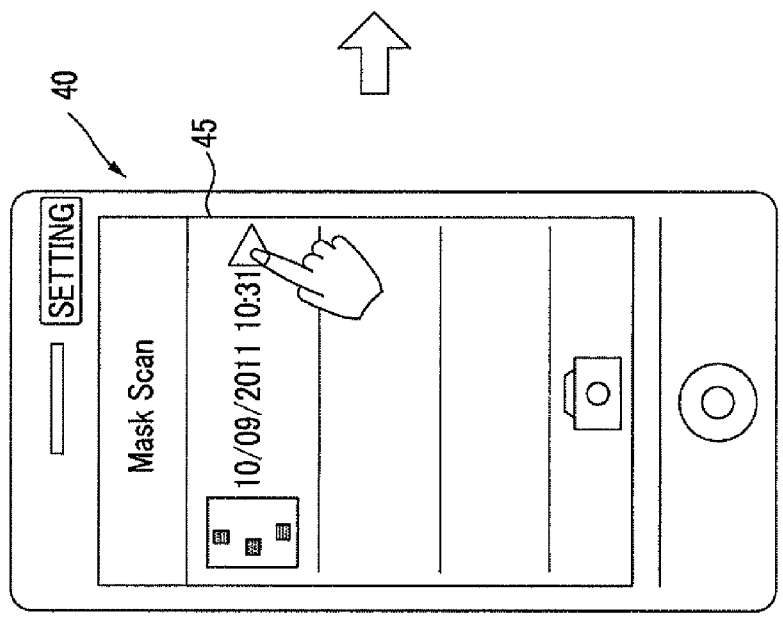

IMAGE READER, MOBILE TERMINAL APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-006658 filed Jan. 17, 2012.

BACKGROUND

Technical Field

The present invention relates to an image reader, a mobile terminal apparatus, and a non-transitory computer readable medium.

SUMMARY

According to an aspect of the invention, there is provided an image reader including: a reading unit that reads an image; a detection unit that detects marks from the read image read by the reading unit; a creation unit that creates a hiding image, which hides a region including the marks, on the basis of the marks detected by the detection unit; and a combining unit that combines the read image and the hiding image to create an electronic document.

BRIEF DESCRIPTION OF THE DRAWINGS

Exemplary embodiments of the present invention will be described in detail based on the following figures, wherein:

FIG. 2 is a block diagram showing the hardware configuration of an image reader in the image reading system;

FIG. 3 is a block diagram showing the functional configuration of the image reader;

FIG. 9 is a flowchart (continuation) for explaining the flow of the processing executed by the electronic document creation unit provided in the image reader;

FIG. 10 is a view showing a mask scan setting screen in a first setting example;

FIG. 11 is a view showing the relationship between a document image and an electronic document in the first setting example;

FIG. 12 is a view showing a mask scan setting screen in a second setting example;

FIG. 16 is a view showing a mask scan setting screen in a fourth setting example;

FIG. 17 is a view showing the relationship between a document image and an electronic document in the fourth setting example;

FIG. 18 is a view showing a mask scan setting screen in a fifth setting example;

FIG. 21 is a view showing the relationship between a document image and an electronic document in the sixth setting example;

FIG. 23 is a block diagram showing the functional configuration of a mobile terminal apparatus;

FIGS. 24A and 24B are views for explaining a first operation example using the mobile terminal apparatus;

FIGS. 26A to 26C are views for explaining a third operation example using the mobile terminal apparatus;

FIGS. 27A and 27B are views for explaining a fourth operation example using the mobile terminal apparatus;

FIGS. 28A and 28B are views for explaining a fifth operation example using the mobile terminal apparatus; and FIGS. 29A and 29B are views for explaining a sixth operation example using the mobile terminal apparatus.

DETAILED DESCRIPTION

Hereinafter, exemplary embodiments of the invention will be described with reference to the accompanying drawings.

First Exemplary Embodiment

Figure 1:
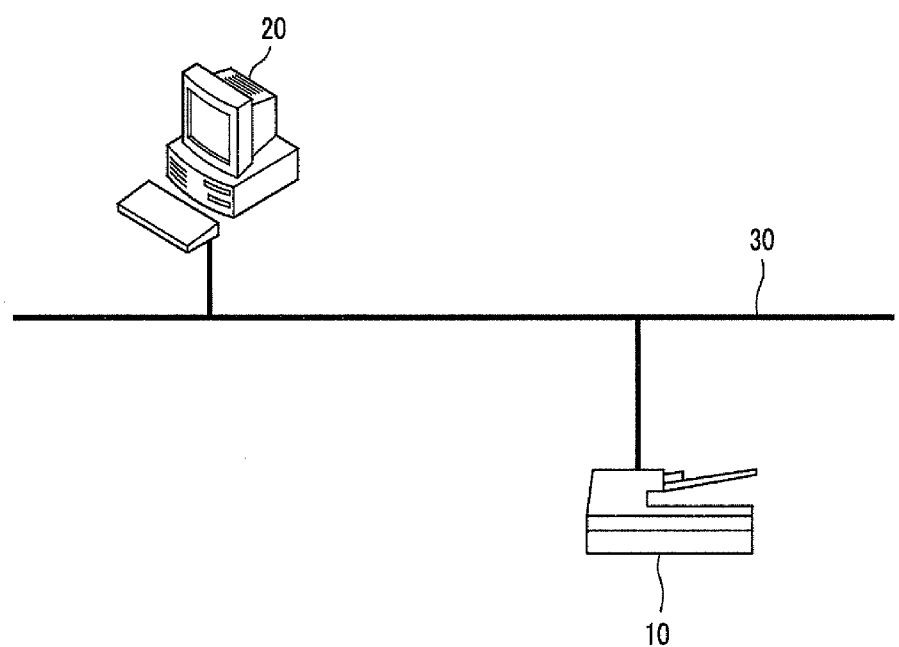
FIG. 1 is a view showing the configuration of an image reading system in a first exemplary embodiment.

FIG. 1 is a view showing the configuration of an image reading system in a first exemplary embodiment.

The image reading system has an image reader 10 and a terminal apparatus 20 connected to each other through a network 30. Here, the image reader 10 has a function of reading an image formed on the set document, a function of creating an electronic document on the basis of the read image, and a function of outputting the created electronic document through the network 30. On the other hand, the terminal apparatus 20 has a function of acquiring the electronic document created by the image reader 10 through the network 30, a function of analyzing the content of the acquired electronic document, and a function of displaying an image obtained by analyzing the electronic document.

FIG. 2 is a block diagram showing the hardware configuration of the image reader 10 in the image reading system shown in FIG. 1.

The image reader 10 includes: a CPU (Central Processing Unit) 11; a memory 12 formed by a ROM (Read Only Memory) or a RAM (Random Access Memory); a storage device 13 formed by an HDD (Hard Disk Drive) or an SSD (Solid State Drive); a communication device 14 which transmits or receives data (including an electronic document) to or from an external apparatus, such as the terminal apparatus 20, through the network 30; a UI (User Interface) device 15 which receives input from a user and also outputs (displays) instructions to the user; and a scanner 16 which reads an image of a document. In addition, the image reader 10 further includes a bus 18 which connects these components to each other. In addition, the scanner 16 as an example of a reading unit has a function of outputting full-color image data by reading an image of three colors of RGB, for example.

In the image reader 10, the CPU 11 controls the operation of the image reader 10 including image processing by executing processing based on a control program read from the memory 12 or the storage device 13. In addition, instead of being stored in advance in the memory 12 or the storage device 13, the control program executed by the CPU 11 may be stored in storage media, such as a CD-ROM, and provided to the CPU 11 or may be provided to the CPU 11 through the network 30, for example.

FIG. 3 is a block diagram showing the functional configuration of the image reader 10 which is realized by executing the control program described above.

The image reader 10 includes an electronic document creation unit 100 which creates an electronic document by performing image processing on image data (in the following explanation, referred to as original image data) obtained when the scanner 16 reads a document. The electronic document creation unit 100 includes a reading setting unit 110, a mark detection unit 120, an additional data creation unit 130, and an electronic document combining unit 140.

When reading an image of a document, the reading setting unit 110 performs a setting regarding whether or not to execute a first reading operation (hereinafter, referred to as a normal scan) of outputting the content of original image data input from the scanner 16 without changing the content or a second reading operation (hereinafter, referred to as a mask scan) of outputting the content of an image of a region, which is covered with a mask, in a state where the content is hidden by putting a mask on a part of the original image data. In addition, this setting is performed in response to an instruction received through the UI device 15.

When a setting of a mask scan is done by the reading setting unit 110, the mark detection unit 120 as an example of a detection unit detects a mark, which may be a target position of mask formation, from the original image data in response to an instruction received through the UI device 15. In addition, details of the "Mark" in the present exemplary embodiment will be described later.

When a setting of a mask scan is done by the reading setting unit 110, the additional data creation unit 130 as an example of a creation unit sets a region (region to be converted), in which a mask is to be formed for the original image data, on the basis of the mark detected by the mark detection unit 120 and the instruction received through the UI device 15 and creates additional data (mask data) including the mask image data corresponding to the set region to be converted and the accompanying data set in association with the mask image. Here, the additional data creation unit 130 includes a target region setting section 131 which sets the above-described region to be converted, a mask data creation section 132 which creates the above-described mask data, and a character information acquisition section 133 which acquires information of characters present in the original image data by performing OCR (Optical Character Recognition) processing on the original image data. In addition, details of the additional data will be described later.

When a setting of a mask scan is done by the reading setting unit 110, the electronic document combining unit 140 as an example of a combining unit creates an electronic document by combining the additional data created by the additional data creation unit 130 with the original image data, which is the source of the additional data, and outputs the obtained electronic document (hereinafter, referred to as a mask-processed document). In addition, when a setting of a normal scan is done by the reading setting unit 110, the electronic document combining unit 140 outputs the single original image data as an electronic document (hereinafter, referred to as a normally processed document). Moreover, in the present exemplary embodiment, the electronic document combining unit 140 outputs the electronic document as a PDF (Portable Document Format) file.

Figure 4A:
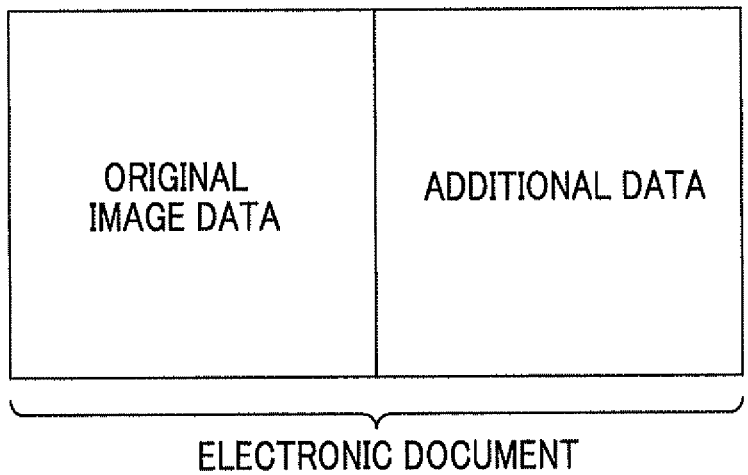
FIGS. 4A and 4B are views for explaining the data structure of an electronic document.
Figure 4B:
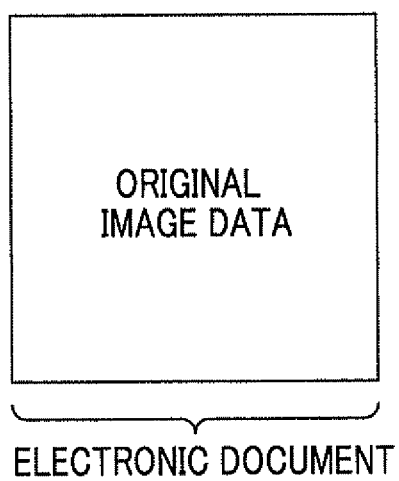

FIGS. 4A and 4B are views for explaining the data structures of electronic documents output from the electronic document combining unit 140. Here, FIG. 4A shows the data structure of a mask-processed document, and FIG. 4B shows the data structure of a normally processed document.

As described above, the mask-processed document includes original image data and additional data created on the basis of the original image data. On the other hand, the normally processed document includes original image data but does not include additional data.

Figure 5:
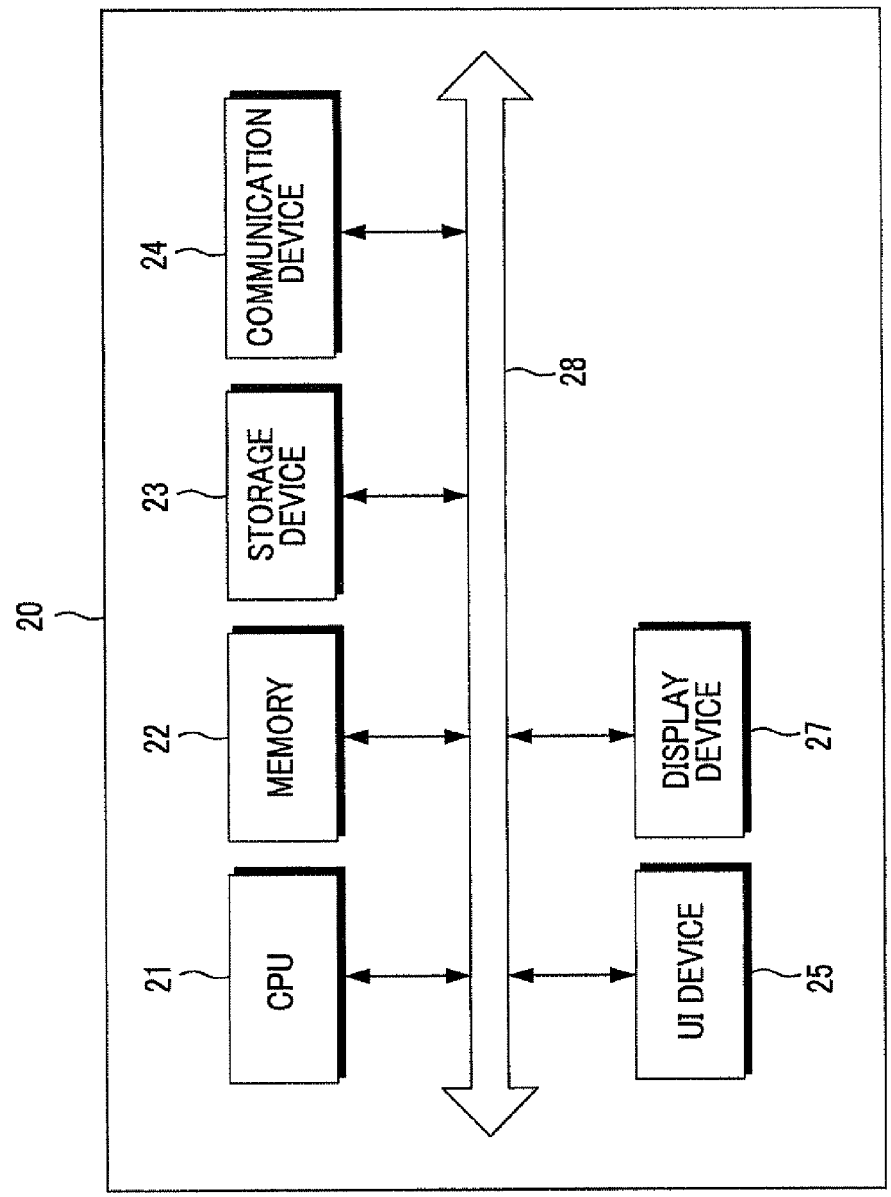
FIG. 5 is a block diagram showing the hardware configuration of a terminal apparatus in the image reading system.

FIG. 5 is a block diagram showing the hardware configuration of the terminal apparatus 20 in the image reading system shown in FIG. 1.

The image reader 20 includes: a CPU (Central Processing Unit) 21; a memory 22 formed by a ROM (Read Only Memory) or a RAM (Random Access Memory); a storage device 23 formed by an HDD (Hard Disk Drive) or an SSD (Solid State Drive); a communication device 24 which transmits or receives data (including the electronic document described above) to or from an external apparatus, such as the image reader 10, through the network 30; an UI (User Interface) device 25 which receives an input from a user; and a display device 27 which displays an image based on an electronic document or the like. In addition, the terminal apparatus 20 further includes a bus 28 which connects these components to each other. Here, the terminal apparatus 20 is formed by a personal computer (PC), for example, and the UI device 25 is formed by a keyboard or a mouse. In addition, the display device 27 is formed by a liquid crystal display which displays a full-color image using three colors of RGB, for example.

In the terminal apparatus 20, the CPU 21 controls the operation of the terminal apparatus 20 including image processing by executing processing based on a control program read from the memory 22 or the storage device 23. In addition, instead of being stored in advance in the memory 22 or the storage device 23, the control program executed by the CPU 21 may be stored in storage media, such as a CD-ROM, and provided to the CPU 21 or may be provided to the CPU 21 through the network 30, for example.

Figure 6:
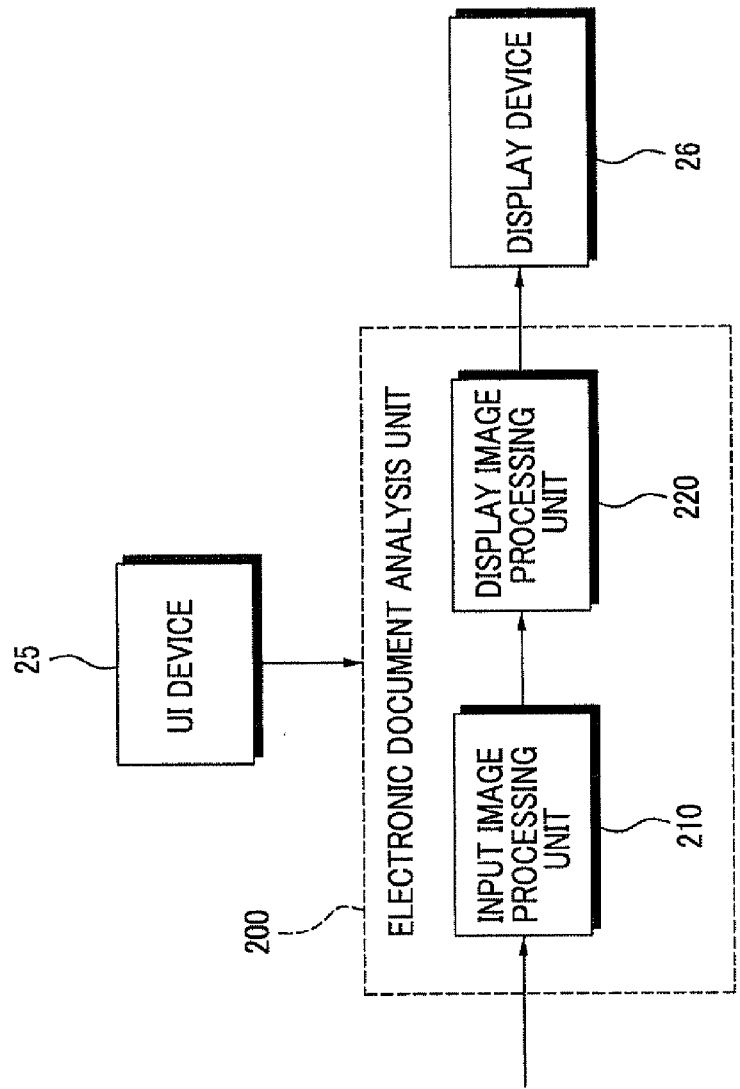
FIG. 6 is a block diagram showing the functional configuration of the terminal apparatus.

FIG. 6 is a block diagram showing the functional configuration of the terminal apparatus 20 which is realized by executing the control program described above.

The terminal apparatus 20 includes an electronic document analysis unit 200 that analyzes an electronic documents input from the image reader 10 through the network 30. This electronic document analysis unit 200 includes an input image processing unit 210 and a display image processing unit 220.

The input image processing unit 210 executes processing for analyzing the content of the input electronic document and extracts the original image data. In addition, when additional data is included in the electronic document (when the electronic document is a mask-processed document), the input image processing unit 210 extracts the additional data further.

The display image processing unit 220 executes processing for displaying on a display device 26 the content of the electronic document analyzed by the input image processing unit 210. In addition, the display image processing unit 220 executes additional processing on the analyzed electronic document on the basis of an instruction received through the UI device 25 and also executes processing for displaying the content of the processed electronic document on the display device 26.

Figure 7:
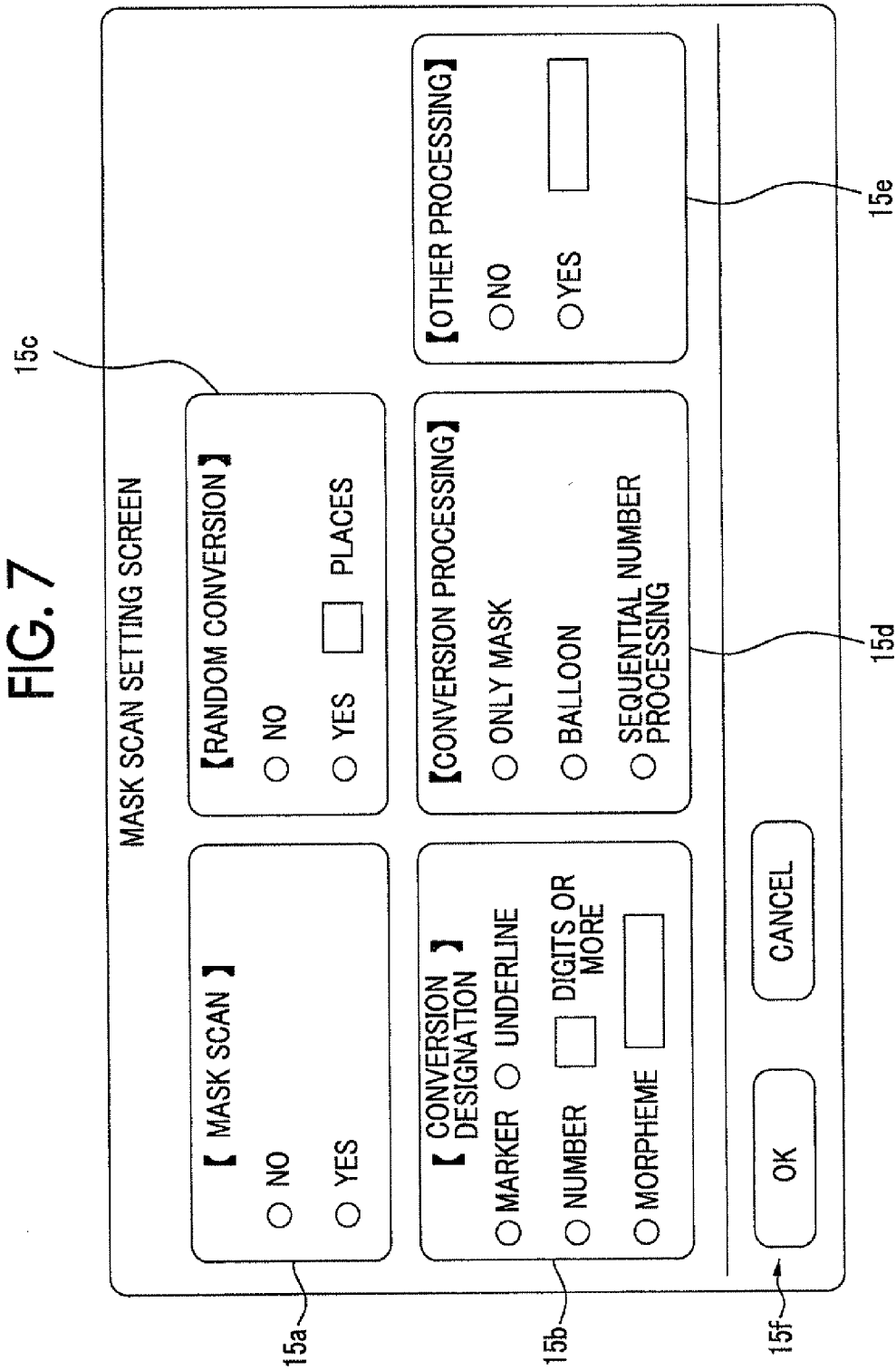
FIG. 7 is a views for explaining a UI image (mask scan setting screen) displayed on a UI device of the image reader.

FIG. 7 is a view for explaining an UI image displayed on the UI device 15 of the image reader 10. In addition, among various UI images displayed on the UI device 15, an image (hereinafter, referred to as a mask scan setting screen) relevant to the setting of the mask scan described above is shown as an example herein.

The mask scan setting screen shown in FIG. 7 has: a mask scan receiving region 15a for receiving the designation of whether or not to execute a mask scan; a conversion designation receiving region 15b for receiving the designation of a mark to be converted into a mask when a mask scan is executed; a random conversion receiving region 15c for receiving the designation of whether to set randomly the number of marks to be converted into masks when a mask scan is executed; a conversion processing receiving region 15d for receiving the designation of the content of mask processing when a mask scan is executed; an other processing receiving region 15e for receiving the designation of whether or not to execute other processing set in the mask processing when a mask scan is executed; and a confirm and cancel receiving portion 15f for receiving the confirmation or cancellation of each setting of the mask scan described above.

Among these, the mask scan receiving region 15a is configured to receive the selection of either "Yes" or "No" with respect to a mask scan.

In addition, the conversion designation receiving region 15b is configured to receive the selection of any one of "Marker", "Underline", "Number", and "Morpheme" as a mark which is a target of conversion designation. Here, the "Marker" refers to a translucent image formed on a character image so as to overlap each other. For example, the "Marker" is formed by a highlighter pen (a line marker or a fluorescent marker). In addition, the "Underline" refers to a linear image drawn on the lower side of a character image. For example, the "Underline" is formed by a ballpoint pen, the highlighter pen described above, or the like. In addition, the "Number" refers to an image based on a Chinese numeral or an Arabic numeral in a character image. Here, when the selection of the "Number" is received, the conversion designation receiving region 15b receives the input of the number of digits of a number which is a target of conversion designation. In addition, the "morpheme" refers to the type of the part of speech formed by a character image. In addition, when the selection of "Morpheme" is received, the conversion designation receiving region 15b receives the selection of the specific content of the morpheme. In addition, in the present exemplary embodiment, selection of any one of "Noun", "Verb", and "Proper noun" is received as the morpheme (refer to FIG. 20 which will be described later).

In addition, the random conversion receiving region 15c is configured to receive the selection of either "Yes" or "No" with respect to random conversion. In addition, when the selection of "Yes" is received with respect to the random conversion, the random conversion receiving region 15c receives the number (places) of marks which are targets of random conversion.

In addition, the conversion processing receiving region 15d is configured to receive, as the content of conversion processing, the selection of any one of "Only mask" which forms only a mask with uniform density (hereinafter, referred to as a normal mask) as a hidden image, "Balloon" which forms a balloon for displaying a correct answer as a hidden image in addition to a normal mask, and "Sequential number processing" which forms masks to which sequential numbers are given (hereinafter, referred to as sequentially-numbered masks) as a hidden image instead of a normal mask.

In addition, the other processing receiving region 15e is configured to receive the selection of either "Yes" or "No" with respect to other processing. Here, when the selection of the "Yes" is received with respect to other processing, the other processing receiving region 15e receives the selection of the specific content of other processing. Moreover, in the present exemplary embodiment, the selection of any one of "Next page" which forms an image of the correct answer, which is an image to be hidden, on the next page, "Footer" which forms an image of the correct answer as a foot note of the same page, and "Header" which forms an image of the correct answer as a head note of the same page is received as other processing (refer to FIG. 14 which will be described later).

Figure 8:
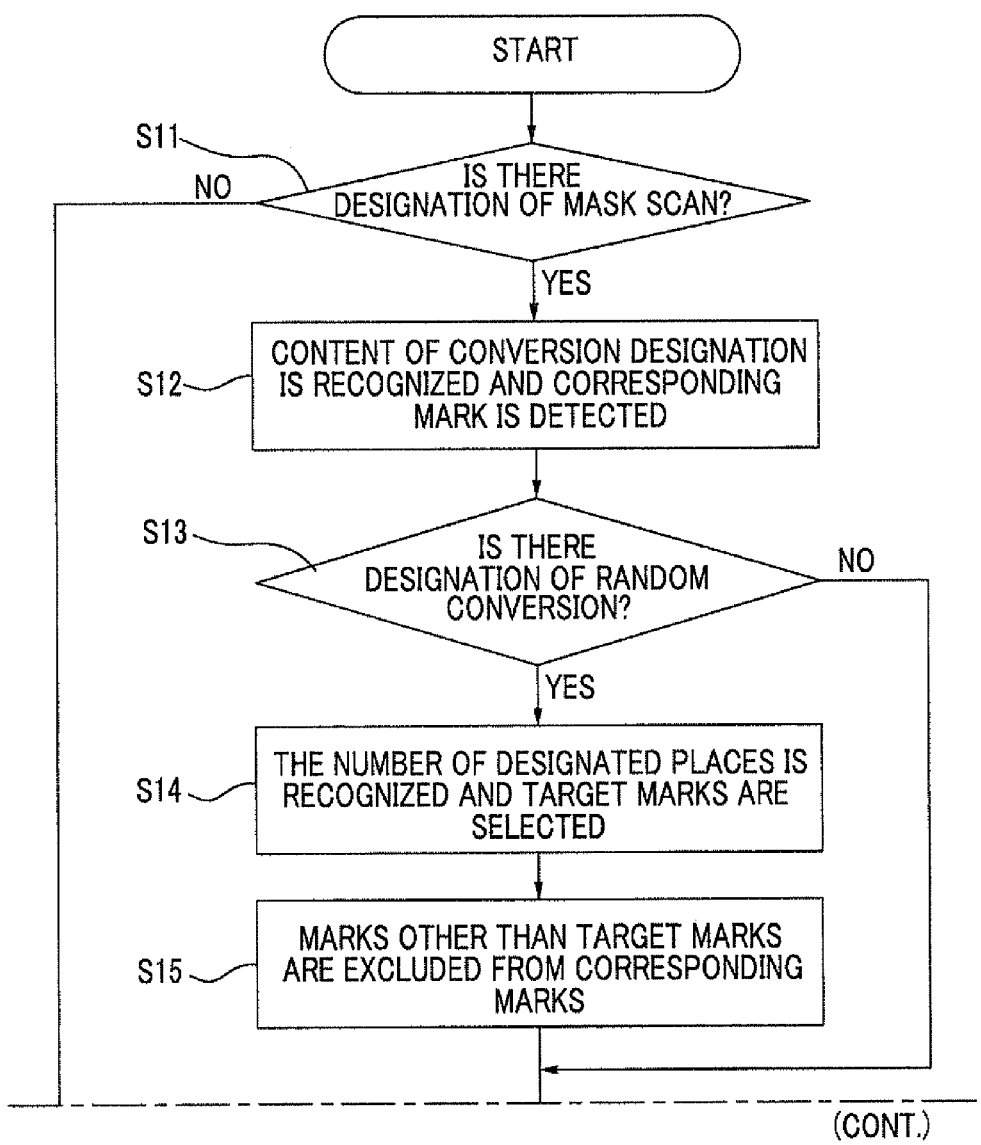
FIG. 8 is a flow chart for explaining the flow of processing executed by an electronic document creation unit provided in the image reader.

FIGS. 8 and 9 are flow charts for explaining the flow of processing executed by the electronic document creation unit 100 provided in the image reader 10 described above. In addition, the following processing is performed according to the document image reading operation executed by the image reader 10, that is, according to the input of original image data to the electronic document creation unit 100.

In this processing, first, the reading setting unit 110 determines whether or not the designation of a mask scan has been received in the mask scan receiving region 15a (step 11). When the determination result is positive (Yes) in step 11, the mark detection unit 120 recognizes the content of the conversion designation received in the conversion designation receiving region 15b and detects a mark corresponding to the content (corresponding mark) (step 12).

Then, the target region setting section 131 determines whether or not the designation of random conversion has been received in the random conversion receiving region 15c (step 13). When the determination result is negative (No) in step 13, the process proceeds to step 16 which will be described later.

On the other hand, when the determination result is positive (Yes) in step 13, the target region setting section 131 recognizes the number of designated places received in the random conversion receiving region 15c and selects target marks, the number of which is the same as the number of designated places, from one or more corresponding marks detected in step (step 14). Then, the target region setting section 131 excludes marks other than the target marks selected in step 14 from one or more corresponding marks detected in step 12 (step 15).

Then, the target region setting section 131 sets a region to be converted, in which a mask is to be formed, on the basis of one or more corresponding marks modified in step 15 after being detected in step 12 or detected in step 12 (step 16). Then, the mask data creation section 132 recognizes the content of conversion processing received in the conversion processing receiving region 15d (step 17).

Then, the target region setting section 131 determines whether or not the conversion processing recognized in step 17 is "Only mask" (step 18). When the determination result is positive (Yes) in step 18, the mask data creation section 132 creates additional data by placing a normal mask in each region to be converted set in step 16 (step 19). Then, the electronic document combining unit 140 creates an electronic document by combining the additional data created in step 19 with the original image data which is the source of the additional data (step 20), and the series of processing is completed.

On the other hand, when the determination result is negative (No) in step 18, the target region setting section 131 determines whether or not the conversion processing recognized in step 17 is "Balloon" (step 21). When the determination result is positive (Yes) in step 21, the character information acquisition section 133 extracts a character string, which is present in each region to be converted set in step 16, from the original image data (step 22). Then, the mask data creation section 132 creates additional data by placing a normal mask in each region to be converted set in step 16 and placing the character string extracted in step 22 as a balloon image interlocked with each normal mask (step 23). Then, the process proceeds to step 20 described above.

In addition, when the determination result is negative (No) in step 21, that is, when the conversion processing recognized in step 17 is "Sequential number processing", the target region setting section 131 determines whether or not the designation of other processing has been received in the other processing receiving region 15*e* (step 24). When the determination result is positive (Yes) in step 24, the character information acquisition section 133 extracts a character string, which is present in each region to be converted set in step 16, from the original image data (step 25). Then, the mask data creation section 132 creates additional data by placing sequentially-numbered masks in each region to be converted set in step 16 and placing the character string extracted in step 25 as a character image corresponding to other processing received in the other processing receiving region 15*e* (step 26). Then, the process proceeds to step 20 described above.

On the other hand, when the determination result is negative (No) in step 24, the mask data creation section 132 creates additional data by placing the sequentially-numbered masks in each region to be converted set in step 16 (step 27). Then, the process proceeds to step 20 described above.

In addition, when the determination result is negative (No) in step 11, the reading setting unit 110 sets a normal scan, and the electronic document combining unit 140 creates an electronic document based on the original image data in step 20.

Next, an electronic document created by the electronic document creation unit 100 will be described through six setting examples. In addition, in the following explanation, the electronic document shown on the drawing is displayed on the display device 27 of the terminal apparatus 20 after being created by the electronic document creation unit 100 provided in the image reader 10.

First Setting Example

FIG. 10 is a view showing a mask scan setting screen in a first setting example. In the first setting example, "Yes" is selected in the mask scan receiving region 15*a*, "Marker" is selected in the conversion designation receiving region 15*b*, "No" is selected in the random conversion receiving region 15*c*, "Only mask" is selected in the conversion processing receiving region 15*d*, and "No" is selected in the other processing receiving region 15*e*. Accordingly, the first setting example corresponds to the case where determinations of "Yes" in step 11, "No" in step 13, and "Yes" in step 18 are performed in the flow chart shown in FIGS. 8 and 9.

FIG. 11 is a view showing the relationship between a document image and an electronic document in the first setting example.

Three English sentences are written in the document image shown in FIG. 11. In addition, in this document image, a character string of the verb in each of the three sentences is overwritten by a marker. In addition, as a result of execution of image processing under the conditions of the first setting example, all three regions where the marker is written in the document image become regions to be converted. Accordingly, compared with the original image data based on the document image, the obtained electronic document becomes an electronic document in which each of the three regions to be converted is covered with a normal mask.

Second Setting Example

FIG. 12 is a view showing a mask scan setting screen in a second setting example. In the second setting example, "Yes" is selected in the mask scan receiving region 15*a*, "marker" is selected in the conversion designation receiving region 15*b*, "No" is selected in the random conversion receiving region 15*c*, "Balloon" is selected in the conversion processing receiving region 15*d*, and "No" is selected in the other processing receiving region 15*e*. Accordingly, the second setting example corresponds to the case where determinations of "Yes" in step 11, "No" in step 13, "No" in step 18, and "Yes" in step 21 are performed in the flow chart shown in FIGS. 8 and 9.

Figure 13:
FIG. 13 is a view showing the relationship between a document image and an electronic document in the second setting example.

FIG. 13 is a view showing the relationship between a document image and an electronic document in the second setting example.

The document image shown in FIG. 13 is the same as that in the first setting example. In addition, as a result of execution of image processing under the conditions of the second setting example, all three regions where the marker is formed in the document image become regions to be converted. Accordingly, compared with the original image data based on the document image, the obtained electronic document becomes an electronic document in which each of the three regions to be converted is covered with a normal mask. Moreover, in the electronic document created under the conditions of the second setting example, when an operation of placing a pointer on the screen of the display device 27 on a normal mask is performed through the UI device 25 of the terminal apparatus 20, the character image (correct answer) present in the back of the normal mask in the document image is displayed together with a balloon.

Third Setting Example

Figure 14:
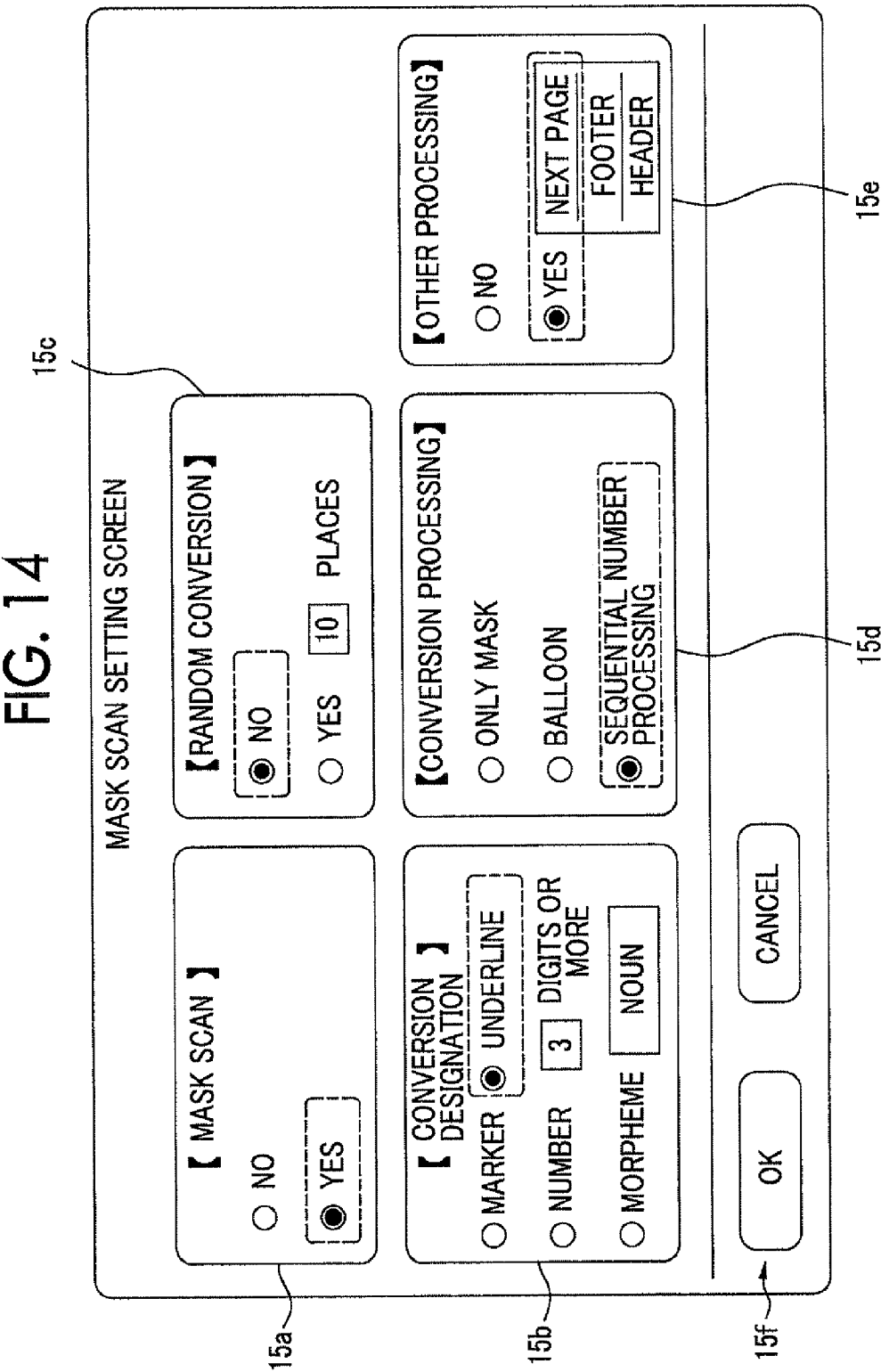
FIG. 14 is a view showing a mask scan setting screen in a third setting example.

FIG. 14 is a view showing a mask scan setting screen in a third setting example. In the third setting example, "Yes" is selected in the mask scan receiving region 15*a*, "Underline" is selected in the conversion designation receiving region 15*b*, "No" is selected in the random conversion receiving region 15*c*, "sequential number processing" is selected in the conversion processing receiving region 15*d*, and "Yes" and "Next page" are selected in the other processing receiving region 15*e*. Accordingly, the third setting example corresponds to the case where determinations of "Yes" in step 11, "No" in step 13, "No" in step 18, "No" in step 21, and "Yes" in step 24 are performed in the flow chart shown in FIGS. 8 and 9.

Figure 15:
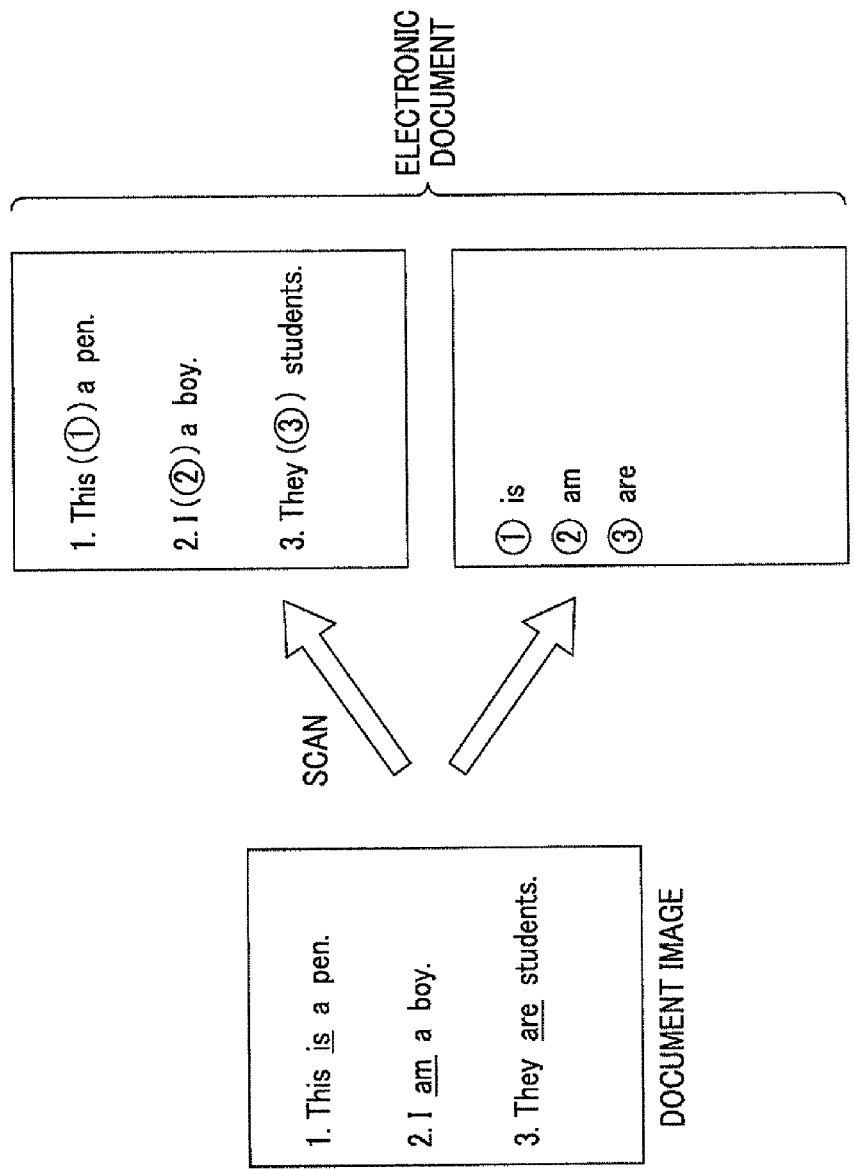
FIG. 15 is a view showing the relationship between a document image and an electronic document in the third setting example.

FIG. 15 is a view showing the relationship between a document image and an electronic document in the third setting example.

Three English sentences written in the document image shown in FIG. 15 are the same as those in the first setting example. In this document image, however, the underline is written under a character string of the verb in each of the three sentences. In addition, as a result of execution of image processing under the conditions of the third setting example, all upper character regions of three regions where the underline is written in the document image become regions to be converted. Accordingly, compared with the original image data based on the document image, the obtained electronic document becomes an electronic document in which the three regions to be converted are covered with sequentially-numbered masks (here, 1 to 3). In addition, in the electronic document created under the conditions of the third setting example, the next page is added to the page based on the original image data. On the next page, sequential numbers and correct answers (character images present in the back of the sequentially-numbered masks) corresponding to the sequential numbers are displayed so as to match each other.

Fourth Setting Example

FIG. 16 is a view showing a mask scan setting screen in a fourth setting example. In the fourth setting example, "Yes" is selected in the mask scan receiving region 15a, "Underline" is selected in the conversion designation receiving region 15b, "Yes" and "Four places" are selected in the random conversion receiving region 15c, "Only mask" is selected in the conversion processing receiving region 15d, and "No" is selected in the other processing receiving region 15e. Accordingly, the fourth setting example corresponds to the case where determinations of "Yes" in step 11, "Yes" in step 13, and "Yes" in step 18 are performed in the flow chart shown in FIGS. 8 and 9.

FIG. 17 is a view showing the relationship between a document image and an electronic document in the fourth setting example.

In the document image shown in FIG. 17, English conversation sentence of 10 lines are written. In addition, in this document image, "are" in the first line, "and" in the second line, "too" in the third line, "to" and "with" in the sixth line, "will" in the eighth line, and "you" in the ninth line are underlined. In addition, as a result of execution of image processing under the conditions of the fourth setting example, upper character regions of only four regions (in this example, "and" in the second line, "too" in the third line, "with" in the sixth line, and "will" in the eighth line) among the seven regions underlined in the document image become regions to be converted, and "are" in the first line and the like are excluded from the region to be converted. As a result, compared with the original image data based on the document image, the obtained electronic document becomes an electronic document in which each of the four regions to be converted is covered with a normal mask.

Fifth Setting Example

FIG. 18 is a view showing a mask scan setting screen in a fifth setting example. In the fifth setting example, "Yes" is selected in the mask scan receiving region 15a, "Number" and "Three digits or more" are selected in the conversion designation receiving region 15b, "No" is selected in the random conversion receiving region 15c, "balloon" is selected in the conversion processing receiving region 15d, and "No" is selected in the other processing receiving region 15e. Accordingly, the fifth setting example corresponds to the case where determinations of "Yes" in step 11, "No" in step 13, "No" in step 18, and "Yes" in step 21 are performed in the flow chart shown in FIGS. 8 and 9.

Figure 19:
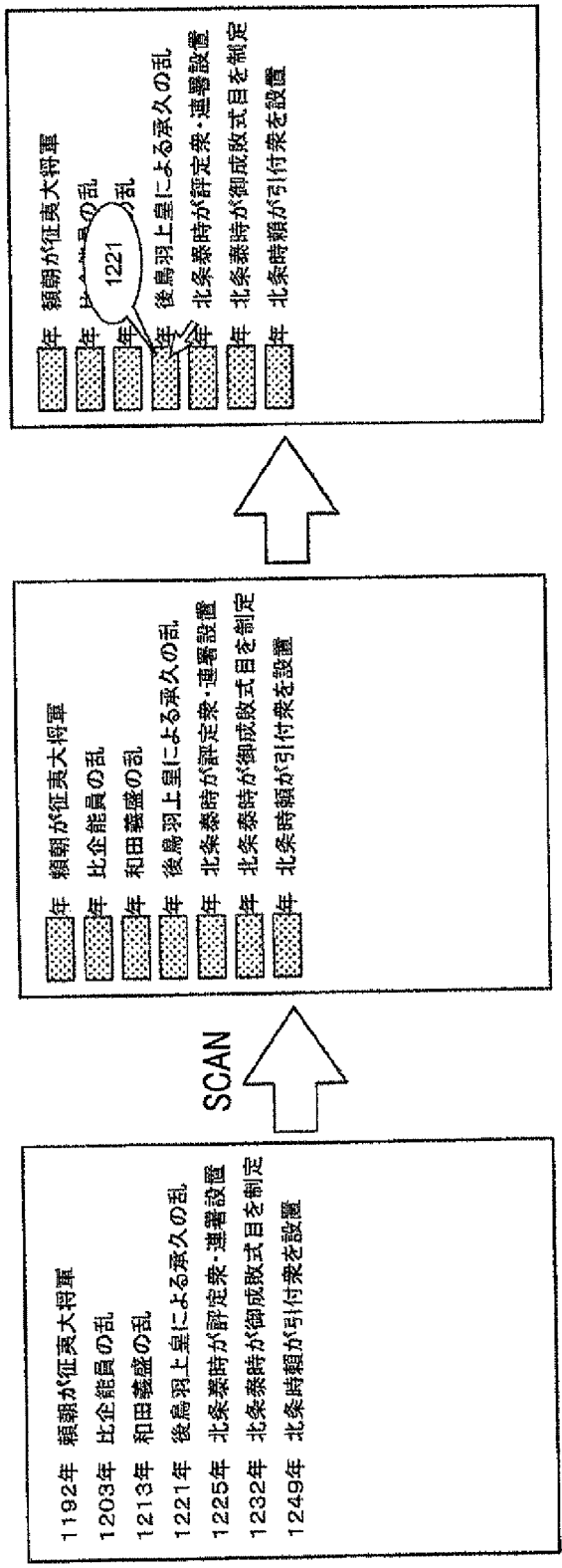
FIG. 19 is a view showing the relationship between a document image and an electronic document in the fifth setting example.

FIG. 19 is a view showing the relationship between a document image and an electronic document in the fifth setting example.

In the document image shown in FIG. 19, Japanese sentences of 7 lines are written. In addition, this document image is based on the chronology of history, and the year using Arabic numerals is written at the beginning of each line. In addition, as a result of execution of image processing under the conditions of the fifth setting example, all of seven regions where four digits are written in the document image and their surround areas become regions to be converted. Accordingly, compared with the original image data based on the document image, the obtained electronic document becomes an electronic document in which each of the seven regions to be converted is covered with a normal mask. Moreover, similar to the second setting example, in the electronic document created under the conditions of the fifth setting example, when an operation of placing a pointer on the screen of the display device 27 on a normal mask is performed through the UI device 25 of the terminal apparatus 20, the character image (correct answer) present in the back of the normal mask in the document image is displayed together with a balloon.

Sixth Setting Example

Figure 20:
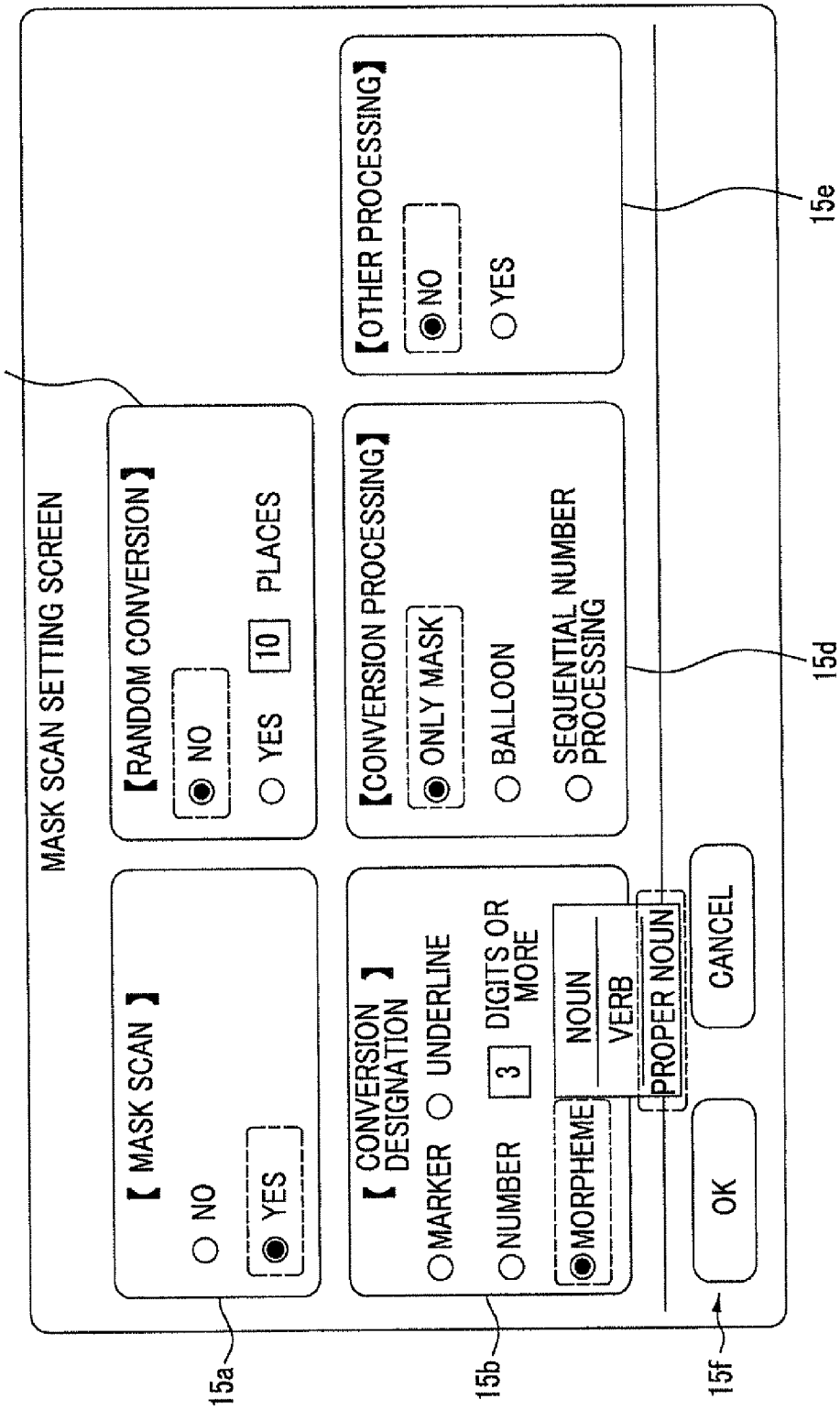
FIG. 20 is a view showing a mask scan setting screen in a sixth setting example.

FIG. 20 is a view showing a mask scan setting screen in a sixth setting example. In the sixth setting example, "Yes" is selected in the mask scan receiving region 15a, "Morpheme" and "Proper noun" are selected in the conversion designation receiving region 15b, "No" is selected in the random conversion receiving region 15c, "Only mask" is selected in the conversion processing receiving region 15d, and "No" is selected in the other processing receiving region 15e. Accordingly, the sixth setting example corresponds to the case where determinations of "Yes" in step 11, "No" in step 13, and "Yes" in step 18 are performed in the flow chart shown in FIGS. 8 and 9.

FIG. 21 is a view showing the relationship between a document image and an electronic document in the sixth setting example.

The document image shown in FIG. 21 is the same as that in the fifth setting example. In addition, as a result of execution of image processing under the conditions of the sixth setting example, all of ten regions where proper nouns (names and the like) are written in the document image and their surround areas become regions to be converted. Compared with the original image data based on the document image, the obtained electronic document becomes an electronic document in which each of the ten regions to be converted is covered with a normal mask.

Second Exemplary Embodiment

In the first exemplary embodiment, the image reader 10 which reads an image of a document and also creates an electronic document on the basis of the reading result and the terminal apparatus 20 which displays the created electronic document are separately provided. In contrast, in the present exemplary embodiment, an image reading function, an electronic document creation function, and an electronic document display function are build into one apparatus.

Figure 22:
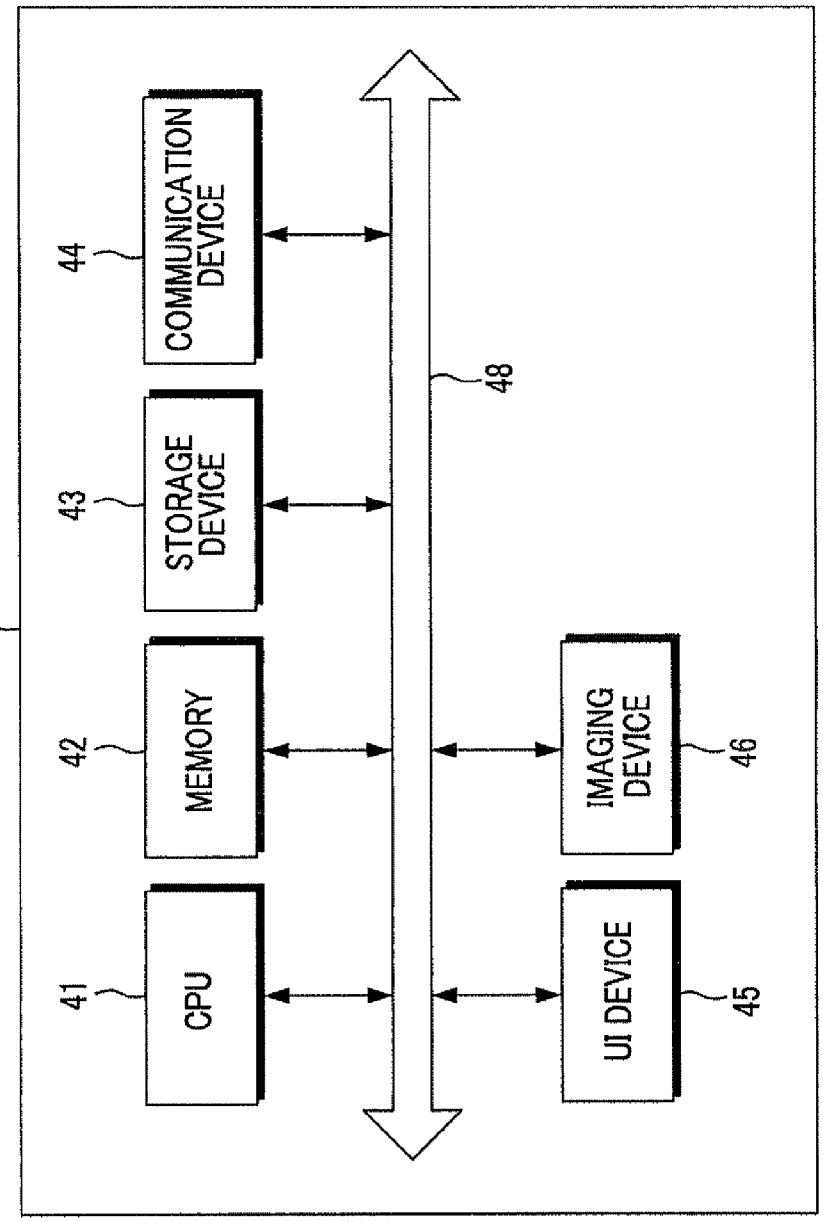
FIG. 22 is a block diagram showing the hardware configuration of a mobile terminal apparatus in a second exemplary embodiment.

FIG. 22 is a block diagram showing the hardware configuration of a mobile terminal apparatus 40 according to a second exemplary embodiment.

The mobile terminal apparatus 40 includes a CPU (Central Processing Unit) 41; a memory 42 formed by a ROM (Read Only Memory) or a RAM (Random Access Memory); a storage device 43 formed by an HDD (Hard Disk Drive) or an SSD (Solid State Drive); a communication device 44 which transmits or receives data to or from another mobile terminal apparatus through a radio network or a telephone line (not shown); an UI (User Interface) device 45 which receives an input from a user and also outputs (displays) instructions to the user; and an imaging device 46 which captures an image of a document or the like. In addition, the mobile terminal apparatus 40 further includes a bus 48 which connects these components to each other. Here, in the present exemplary embodiment, the UI device 45 also has a function as a display device which displays an electronic document. In addition, the imaging device 46 has a function of outputting full-color image data by acquiring an image of three colors of RGB, for example. In addition, the UT device 45 also has a function of displaying a full-color image using three colors of RGB, for example.

In the mobile terminal apparatus 40, the CPU 41 controls the operation of the mobile terminal apparatus 40 including image processing by executing processing based on a control program read from the memory 42 or the storage device 43. In addition, instead of being stored in advance in the memory 42 or the storage device 43, the control program executed by the CPU 41 may be stored in storage media, such as a CD-ROM, and provided to the CPU 41 or may be provided to the CPU 11 through the communication device 44 from an external network (not shown), for example.

FIG. 23 is a block diagram showing the functional configuration of the mobile terminal apparatus 40 which is realized by executing the control program described above.

The mobile terminal apparatus 40 includes an electronic document processing unit 400 that creates an electronic document by performing image processing on image data (original image data) obtained when the imaging device 46 captures a document and that creates a display image by performing image processing on the created electronic document. In addition, the electronic document processing unit 400 includes an electronic document creation unit 100 that creates an electronic document, an electronic document storage unit 300 that stores the electronic document created by the electronic document creation unit 100, and an electronic document analysis unit 200 that analyzes the electronic document read from the electronic document storage unit 300. In addition, the electronic document creation unit 100 is the same as that provided in the image reader 10 in the first exemplary embodiment (refer to FIG. 3), and the electronic document analysis unit 200 is the same as that provided in the terminal apparatus 20 in the first exemplary embodiment (refer to FIG. 6). In addition, the electronic document storage unit 300 is realized by a storage device 43 (refer to FIG. 22), for example.

In addition, the UI device 45 as an example of a display unit includes an instruction receiving unit 451 that receives instructions from a user, and a display unit 452 that displays an image created by the electronic document analysis unit 200.

In addition, the case where the mobile terminal apparatus is a mobile phone (including a smart phone) with a photographing function will be described as an example herein. However, the mobile terminal apparatus 40 does not need to have a communication function. For example, the mobile terminal apparatus 40 may be a PDA (Personal Digital Assistant) with a photographing function, a digital camera, or the like.

FIGS. 24A and 24B are views for explaining operation examples using the mobile terminal apparatus 40 of the present exemplary embodiment. In addition, operations regarding the creation of an electronic document and the display of an image based on the created electronic document, among various operations executed by the mobile terminal apparatus 40, are shown as examples herein.

FIG. 24A is a view showing a state where desktop is displayed on the UI device 45 of the mobile terminal apparatus 40. Plural icons including a mask scan are displayed on the desktop. In addition, a setting of a mask scan is started by tapping the "Mask scan" icon.

FIG. 24B is a view showing a state where a mask scan screen is displayed on the UI device 45 of the mobile terminal apparatus 40. Here, a photographing icon which imitates a camera is displayed on the lower side of the mask scan screen. In addition, by pressing a setting button provided on the upper right side of the mobile terminal apparatus 40 in a state where the mask scan screen is displayed on the UI device 45, a setting in the mask scan is started.

Figure 25A:
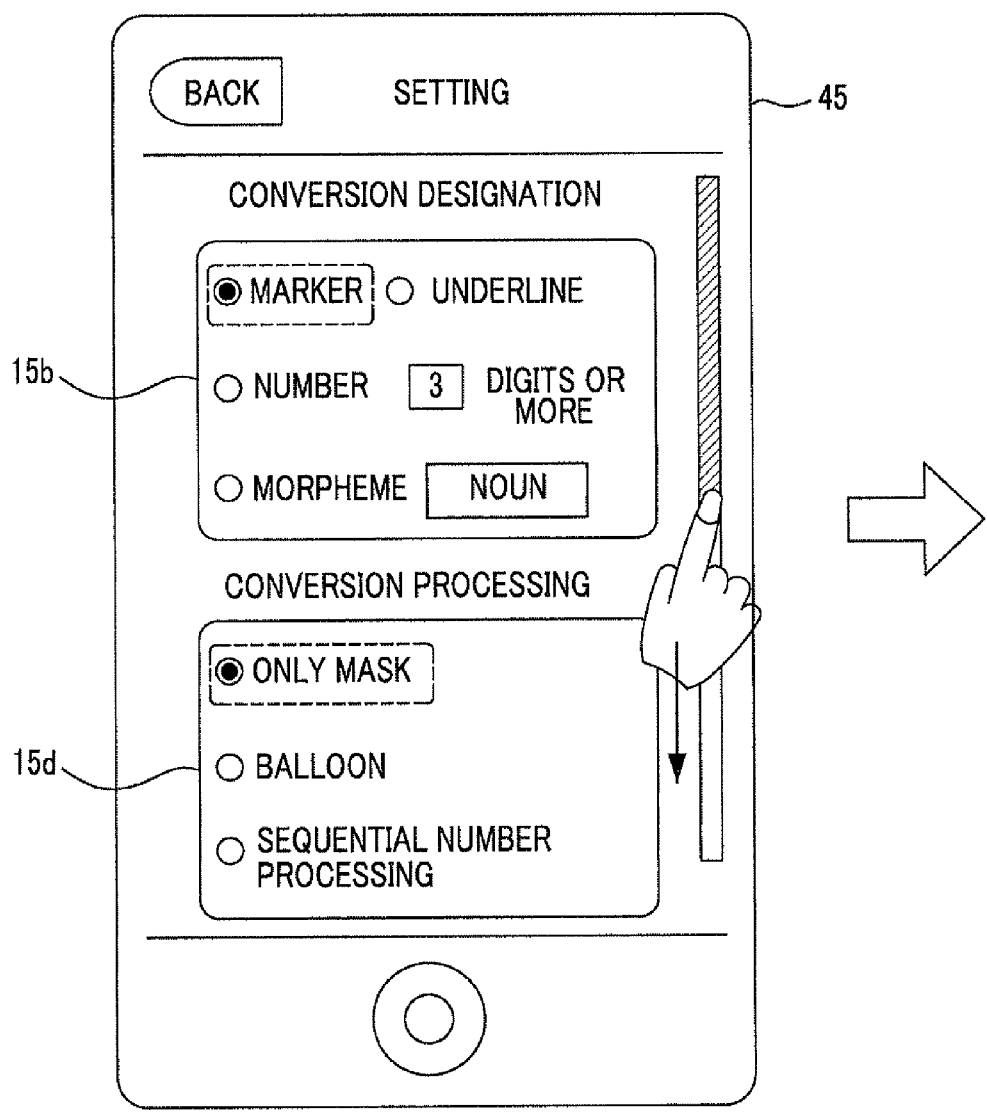
FIGS. 25A and 25B are views for explaining a second operation example using the mobile terminal apparatus.
Figure 25B:
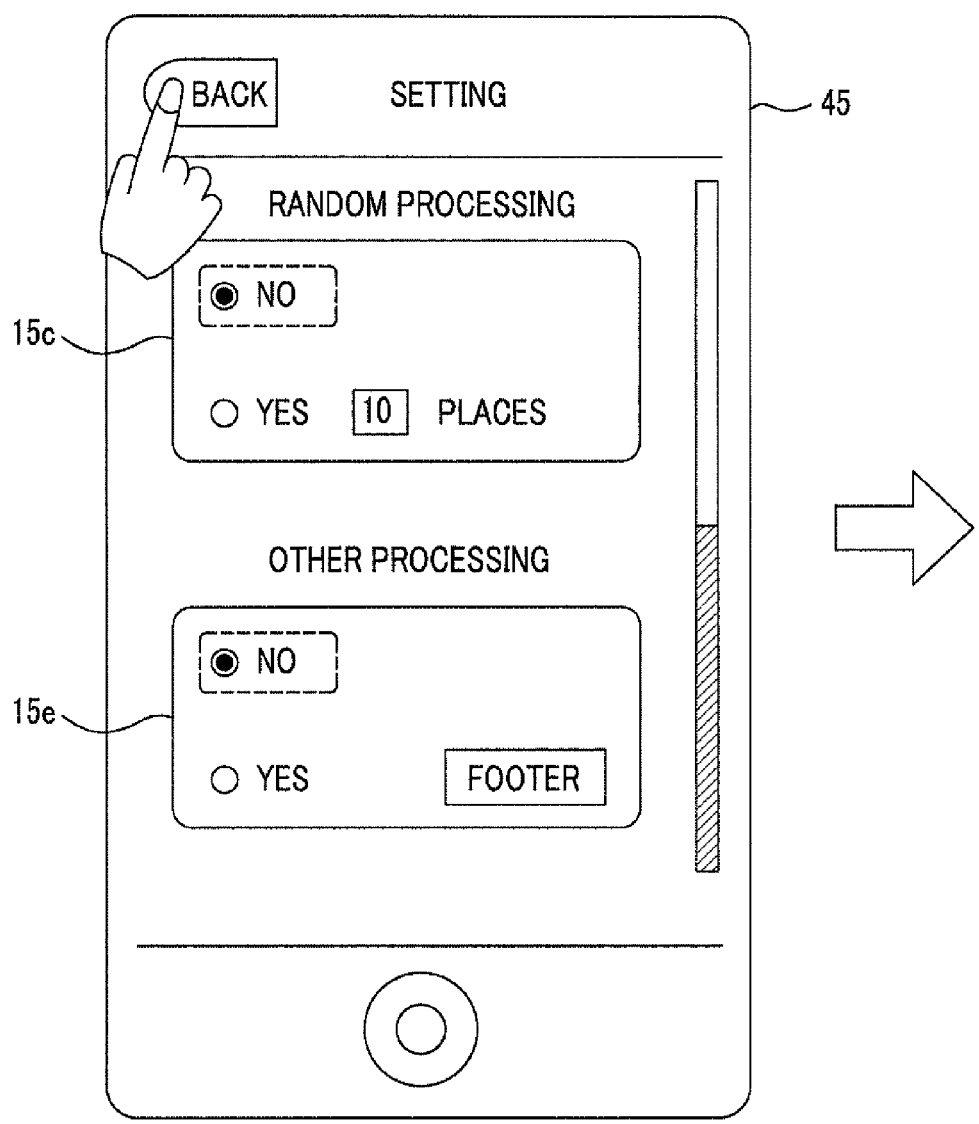

FIG. 25A is a view showing a state where the conversion designation receiving region 15*b* and the conversion processing receiving region 15*d* are displayed as a mask scan setting screen on the UI device 45 of the mobile terminal apparatus 40. A scroll bar extending in the vertical direction in the drawing is further displayed on this screen. In addition, the display content of the screen is changed as the scroll bar slides. FIG. 25B is a view showing a state where the random conversion receiving region 15*c* and the other processing receiving region 15*e* are displayed as a mask scan setting screen on the UI device 45 of the mobile terminal apparatus 40 by sliding the scroll bar described above.

As shown in FIGS. 25A and 25B, the display content of the conversion designation receiving region 15*b*, the random conversion receiving region 15*c*, the conversion processing receiving region 15*d*, and the other processing receiving region 15*e* is the same as that described in the first exemplary embodiment. When a user taps the screen of the UI device 45, each setting is received. In addition, each setting is determined by tapping a "Back" button provided in an upper left portion of the screen.

In addition, in the example shown in FIGS. 25A and 25B, "Marker" is selected in the conversion designation receiving region 15*b*, "Only mask" is selected in the conversion processing receiving region 15*d*, "No" is selected in the random conversion receiving region 15*c*, and "No" is selected in the other processing receiving region 15*e*.

FIG. 26A is a view showing a state where a mask scan screen is displayed again on the UI device 45 of the mobile terminal apparatus 40 after various settings regarding the mask scan are received. In this screen, the transition to the imaging screen is performed when a photographing icon displayed on the lower side is tapped.

FIG. 26B is a view showing a state where an imaging screen is displayed on the UI device 45 of the mobile terminal apparatus 40. In addition, FIG. 26C shows a document image to be photographed. A photographing target (here, a document image shown in FIG. 26C) and an imaging icon, which imitates a camera for executing imaging, are displayed on the imaging screen displayed on the UI device 45. In addition, when the imaging icon is tapped, the imaging device 46 (refer to FIG. 22) provided in the mobile terminal apparatus 40 captures a document image shown in FIG. 26C. In addition, in this example, the document image to be photographed is the same as those described in the first and second setting examples of the first exemplary embodiment.

FIG. 27A is a view showing a state where a mask processing setting screen is displayed on the UI device 45 of the mobile terminal apparatus 40 after the execution of imaging. On the mask processing setting screen displayed on the UI device 45, an image (based on the original image data) obtained by imaging of the imaging device 46 and an execution icon for executing mask processing are displayed. In addition, by tapping the execution icon, mask processing based on the setting shown in FIGS. 25A and 25B is executed on the original image data obtained by reading the document image shown in FIG. 26C.

FIG. 27B is a view showing a state where an electronic document obtained by executing mask processing on the original image data is displayed on the UI device 45 of the mobile terminal apparatus 40. In this example, an electronic document obtained by executing mask processing with the same processing content as in the first setting example of the first exemplary embodiment is displayed. In addition, icons (save and cancel) for selecting whether or not to save the obtained electronic document are displayed in a lower portion of the screen. For example, this electronic document is saved when the "Save" icon is tapped, and this electronic document is discarded when the "Cancel" icon is tapped.

FIG. 28A shows a screen displayed on the UI device 45 of the mobile terminal apparatus 40 when the "Save" icon is tapped in the screen shown, in FIG. 27B. In this example, the message "Saved" and an "OK" icon prompting the user to confirm it are displayed so as to overlap the electronic document subjected to mask processing. In addition, saving of the electronic document is completed by tapping this icon.

FIG. 28B shows a screen displayed on the UI device 45 of the mobile terminal apparatus 40 after the "OK" icon is tapped in the screen shown in FIG. 28A. In this example, a "Back" icon is displayed together with the saved electronic document.

FIG. 29A is a view showing a state where a mask scan screen is displayed on the UI device 45 of the mobile terminal apparatus 40 when the "Back" icon is tapped in the screen shown in FIG. 28B. Here, when the electronic document is saved, a thumbnail of the electronic document and creation date and time of the electronic document are displayed side by side above the photographing icon. In addition, a triangular call icon corresponding to the electronic document is further displayed.

FIG. 29B is a view showing an electronic document displayed on the UI device 45 of the mobile terminal apparatus 40 when the call icon is tapped in the screen shown in FIG. 29A. In addition, the user checks a word and the like, which are to be present in a portion subjected to mask processing, referring to the electronic document displayed on the UI screen.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. An image reader comprising:
a reading unit that reads an image;
a detection unit that detects marks from the read image read by the reading unit;
a creation unit that creates a hiding image, which hides a region including the marks, on the basis of the marks detected by the detection unit; and
a combining unit that combines the read image and the hiding image to create an electronic document,
the creation unit further creating a display image for displaying a hidden image, which is present in a region hidden by the hiding image, in a different region from the hiding image.

2. The image reader according to claim 1,
wherein the creation unit creates the display image so that the hidden image is displayed so as to be interlocked with the hiding image.

3. The image reader according to claim 2,
wherein the creation unit creates the hiding image on the basis of one or more marks, which are randomly selected, of the plurality of marks detected by the detection unit.

4. The image reader according to claim 3,
wherein the detection unit detects a region where a marker is given as the mark, a region where an underline is given, a number string, or a specific character string.

5. The image reader according to claim 2,
wherein the detection unit detects a region where a marker is given as the mark, a region where an underline is given, a number string, or a specific character string.

6. The image reader according to claim 1,
wherein the creation unit creates the display image so that the hidden image is displayed as a header or a footer on the same page as the hiding image or the hidden image is displayed on a different page from the hiding image.

7. The image reader according to claim 6,
wherein the creation unit creates the hiding image on the basis of one or more marks, which are randomly selected, of the plurality of marks detected by the detection unit.

8. The image reader according to claim 7,
wherein the detection unit detects a region where a marker is given as the mark, a region where an underline is given, a number string, or a specific character string.

9. The image reader according to claim 6,
wherein the detection unit detects a region where a marker is given as the mark, a region where an underline is given, a number string, or a specific character string.

10. The image reader according to claim 1,
wherein the creation unit creates the hiding image on the basis of one or more marks, which are randomly selected, of the plurality of marks detected by the detection unit.

11. The image reader according to claim 10,
wherein the detection unit detects a region where a marker is given as the mark, a region where an underline is given, a number string, or a specific character string.

12. The image reader according to claim 1,
wherein the detection unit detects a region where a marker is given as the mark, a region where an underline is given, a number string, or a specific character string.

13. The image reader according to claim 1, wherein the display image for displaying the hidden image, which is present in the region hidden by the hiding image, is displayed in a different region of the electronic document from the hiding image.

14. The image reader according to claim 1, wherein the creation unit creates the hiding image based on one or more marks, which are randomly selected from among the regions corresponding to the marks, of the plurality of marks detected by the detection unit.

15. The image reader according to claim 1, the creation unit further comprising:
a hiding image creation section that creates a type of mask responsive to a user selection from a user interface, and a character information acquisition section that extracts a character string responsive to the type of mask created, and wherein the hiding image creation section creates additional data from the extracted character string that corresponds to the hiding image.

16. A mobile terminal apparatus comprising:

a reading unit that reads an image;

a detection unit that detects marks from the read image read by the reading unit;

a creation unit that creates a hiding image, which hides a region including the marks, on the basis of the marks detected by the detection unit;

a combining unit that combines the read image and the hiding image to create an electronic document; and a display unit that displays the electronic document, the creation unit further creating a display image for displaying a hidden image, which is present in a region hidden by the hiding image, in a different region from the hiding image.

17. A non-transitory computer readable medium storing a program causing a computer to perform a process, the process comprising:

detecting marks from a read image obtained by reading an image;

creating a hiding image for hiding a region including the marks on the basis of the detected marks, and further creating a display image for displaying a hidden image, which is present in a region hidden by the hiding image, in a different region from the hiding image; and combining the read image and the hiding image to create an electronic document.

* * * * *